(12) United States Patent
Takeda et al.

(10) Patent No.: US 11,591,675 B2
(45) Date of Patent: Feb. 28, 2023

(54) STEEL SHEET AND METHOD FOR PRODUCING SAME

(71) Applicant: NIPPON STEEL CORPORATION, Tokyo (JP)

(72) Inventors: Kengo Takeda, Tokyo (JP); Riki Okamoto, Tokyo (JP); Kazuo Hikida, Tokyo (JP); Katsuya Nakano, Tokyo (JP); Yuya Suzuki, Tokyo (JP); Genki Abukawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 137 days.

(21) Appl. No.: 16/466,610

(22) PCT Filed: Feb. 20, 2018

(86) PCT No.: PCT/JP2018/006056
§ 371 (c)(1),
(2) Date: Jun. 4, 2019

(87) PCT Pub. No.: WO2018/151324
PCT Pub. Date: Aug. 23, 2018

(65) Prior Publication Data
US 2020/0071799 A1    Mar. 5, 2020

(30) Foreign Application Priority Data
Feb. 20, 2017    (JP) .............................. JP2017-029289

(51) Int. Cl.
*C22C 38/04*    (2006.01)
*C21D 8/02*    (2006.01)
(Continued)

(52) U.S. Cl.
CPC ............ *C22C 38/04* (2013.01); *C21D 8/0205* (2013.01); *C21D 8/0226* (2013.01);
(Continued)

(58) Field of Classification Search
CPC .............................. C22C 38/04; C21D 8/0205
(Continued)

(56) References Cited

U.S. PATENT DOCUMENTS

| | | |
|---|---|---|
| 2013/0186522 A1 | 7/2013 | Ichimiya et al. |
| 2014/0004378 A1 | 1/2014 | Tanahashi et al. |
| 2014/0013915 A1 | 1/2014 | Kodama et al. |
| 2014/0356641 A1 | 12/2014 | Miyamura et al. |

FOREIGN PATENT DOCUMENTS

| | | |
|---|---|---|
| CN | 103459643 A | 12/2013 |
| CN | 104024459 A | 9/2014 |

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2018/006056, dated Aug. 29, 2019, with English translation of the Written Opinion.
(Continued)

*Primary Examiner* — Weiping Zhu
(74) *Attorney, Agent, or Firm* — Birch, Stewart, Kolasch & Birch, LLP

(57) ABSTRACT

Steel sheet low in cost and improved in fatigue characteristics without causing a drop in the cold formability, characterized in that it comprises an inner layer and a hard layer on one or both surfaces of the inner layer, a thickness of the hard layer is 20 μm or more and 40% or less of the thickness of the steel sheet, an average micro-Vickers hardness of the hard layer is 240 HV or more and less than 400 HV, an amount of C of the hard layer is 0.4 mass % or less, an amount of N is 0.02 mass % or less, a variation of hardness measured by a nanoindenter at a depth of 10 from the surface of the hard layer is a standard deviation of 2.0 or less, an average micro-Vickers hardness of the inner layer is 80 HV
(Continued)

or more and less than 400 HV, a volume rate of carbides contained in the inner layer is less than 2.00%, and the average micro-Vickers hardness of the hard layer is 1.05 times or more the average micro-Vickers hardness of the inner layer.

3 Claims, 1 Drawing Sheet

(51) Int. Cl.
    *C21D 9/46*     (2006.01)
    *C22C 38/22*     (2006.01)
    *C22C 38/34*     (2006.01)

(52) U.S. Cl.
    CPC .............. *C21D 8/0236* (2013.01); *C21D 9/46* (2013.01); *C22C 38/22* (2013.01); *C22C 38/34* (2013.01)

(58) Field of Classification Search
    USPC ......................................................... 420/74
    See application file for complete search history.

(56) References Cited

FOREIGN PATENT DOCUMENTS

| | | | |
|---|---|---|---|
| JP | 3-227233 A | | 10/1991 |
| JP | 03227233 A | * | 10/1991 |
| JP | 8-120341 A | | 5/1996 |
| JP | 10-251800 A | | 9/1998 |
| JP | 2011-111670 A | | 6/2011 |
| JP | 2013-82988 A | | 5/2013 |
| JP | 2015-63737 A | | 4/2015 |
| TW | 201621061 A | | 6/2016 |

OTHER PUBLICATIONS

International Search Report (Form PCT/ISA/210) for International Application No. PCT/JP2018/006056, dated May 15, 2018, with English translation.
Taiwanese Office Action and Search Report for corresponding Taiwanese Application No. 107105784, dated Sep. 21, 2019, with partial English translation.

* cited by examiner

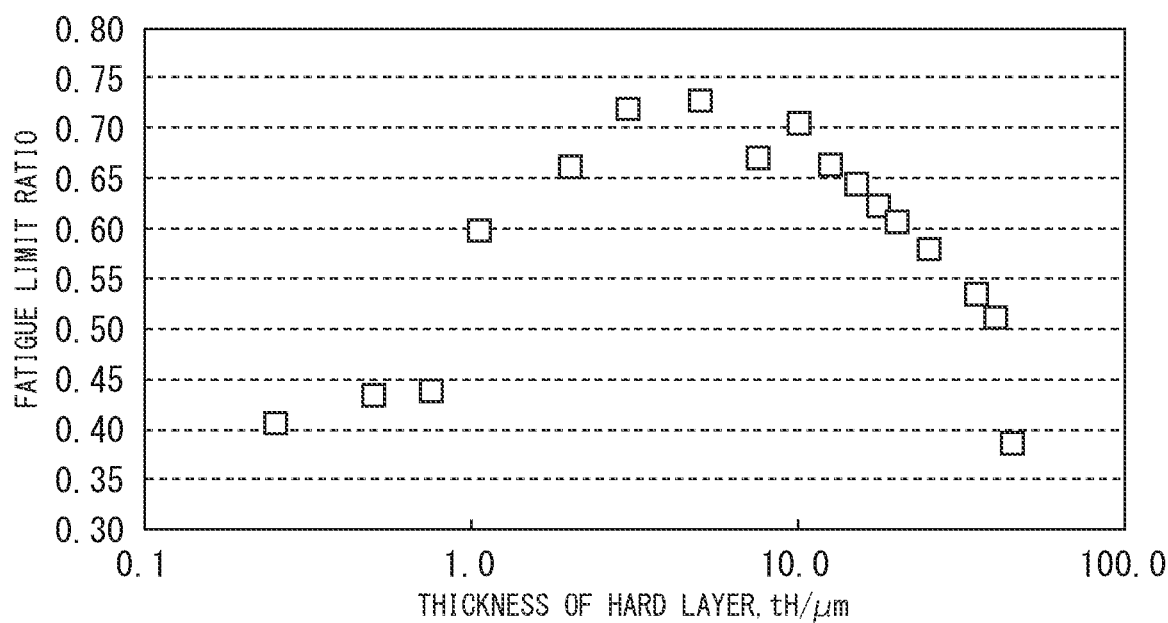

STEEL SHEET AND METHOD FOR PRODUCING SAME

FIELD

The present invention relates to steel sheet and a method for producing the same, more particularly relates to steel sheet having the undercarriage parts of automobiles as its main application and a method for producing the same.

BACKGROUND

In recent years, improvement of the fuel efficiency of automobiles has been desired. Toward this end, automobiles are being required to be made lighter in weight. To make automobiles lighter in weight, it is effective to reduce the thickness of steel sheet for automobile use. However, in this case, improvement of the fatigue strength of the steel sheet becomes an issue. If reducing the thickness of steel sheet, the stress applied to the steel material increases and the fatigue life deteriorates. For this reason, higher fatigue strength steel sheet has been required.

On the other hand, automobile parts are in many cases used after being worked into the shapes of the parts by press forming, roll forming, etc., so excellent cold formability is considered required. To improve the fatigue characteristics, making the steel sheet higher in strength is effective, but making the steel sheet higher in strength is generally accompanied by a drop in the cold formability. How to improve the fatigue characteristics without causing a drop in the cold formability has become an issue.

Considerable art for improving the fatigue characteristics of steel members has been proposed.

PTL 1 relates to high strength hot rolled steel sheet improved in fatigue strength without inviting an increase in costs and further without inviting deterioration of the total elongation and discloses high strength hot rolled steel sheet excellent in fatigue characteristics characterized by comprising a composition containing, by mass %, C: 0.03 to 0.09%, Si: 0.01 to 2.20%, Mn: 0.30 to 2.20%, P: 0.100% or less, S: 0.010% or less, Al: 0.005 to 0.050%, and N: 0.0100% or less and having a balance of iron and unavoidable impurities, having a microstructure in the regions of a thickness corresponding to at least 10% of the sheet thickness from the top and bottom surfaces of steel sheet comprised of a dual phase structure of ferrite and bainite or a single phase structure of bainite, having a microstructure of a region of a thickness corresponding to at least 50% of the sheet thickness at the center part in sheet thickness comprised of a dual phase structure of ferrite and bainite, and having a hardness of the regions of a thickness corresponding to at least 10% of the sheet thickness from the top and bottom surfaces of 1.10 times or more an average hardness of the region of a thickness corresponding to at least 50% of the sheet thickness of the center part in sheet thickness.

PTL 2 relates to steel for carburizing use suitable for materials for high strength gears etc. high in gear root bending fatigue strength and excellent in contact pressure fatigue characteristics and discloses steel for carburizing use comprising a composition containing C: 0.1 to 0.35%, Si: 0.01 to 0.22%, Mn: 0.3 to 1.5%, Cr: 1.35 to 3.0%, P: 0.018% or less, S: 0.02% or less, Al: 0.015 to 0.05%, N: 0.008 to 0.0015%, and O: 0.0015% or less in ranges satisfying the following formulas (1), (2), and (3) and having a balance of Fe and unavoidable impurities and, furthermore, having a structural percentage of a total of ferrite and pearlite in the steel structure of 85% or more, and having an average particle size of ferrite of 25 μm or less:

$$3.1 \geq \{([\% \text{ Si}]/2) + [\% \text{ Mn}] + [\% \text{ Cr}]\} \geq 2.2 \quad (1)$$

$$[\% \text{ C}] - ([\% \text{ Si}]/2) + ([\% \text{ Mn}]/5) + 2[\% \text{ Cr}] \geq 3.0 \quad (2)$$

$$2.5 \geq [\% \text{ Al}]/[\% \text{ N}] \geq 1.7 \quad (3)$$

CITATION LIST

Patent Literature

[PTL 1] Japanese Unexamined Patent Publication No. 2015-63737
[PTL 2] Japanese Unexamined Patent Publication No. 2013-82988

SUMMARY

Technical Problem

Art for changing the quality of steel by heat treatment has the issue to be solved of the change in dimensions and shape of the steel part after cooling. For example, if trying to bend a member to correct its changed shape, strain will be imparted to the surface layer, so the fatigue characteristics will drop. Furthermore, carburizing, nitriding, and induction hardening heat treatment are low in productivity and cause the production costs to remarkably increase, so application to arms, links, etc. is difficult.

The present invention, in consideration of the above situation, has as its object the provision of steel sheet which is low in cost and improved in fatigue characteristics without causing a drop in the cold formability.

Solution to Problem

The inventors engaged in intensive research on methods for solving the above problem. As a result, they discovered that by forming on one or both surfaces of steel sheet a hard layer with an average micro-Vickers hardness of 240 HV or more and less than 400 HV and with a variation of hardness at a depth of 10 μm from the surface of a standard deviation of 2.0 or less and, further, by controlling the amounts of C and N of the hard layer to suitable values, making the average micro-Vickers hardness of the inner layer 80 HV or more and less than 400 HV, controlling the volume rate of carbides contained in the inner layer to less than 2.00%, and making the average micro-Vickers hardness of the hard layer 1.05 times or more the average micro-Vickers hardness of the inner layer, fatigue characteristics and cold workability can both be realized at high levels.

Further, the fact that in the method for producing steel sheet satisfying this, production is difficult even if individually adjusting the hot rolling conditions, annealing conditions, etc. and production is only possible by optimizing the conditions by so-called integrated processes such as hot rolled annealing was discovered by the accumulation of various research thus leading to the completion of the present invention.

The gist of the present invention is as follows:

(1) A steel sheet comprising an inner layer and a hard layer on one or both surfaces of the inner layer, the steel sheet characterized in that a thickness of the hard layer is 20 μm or more and 40% or less of a thickness of the steel sheet, an average micro-Vickers hardness of the hard layer is 240

HV or more and less than 400 HV, an amount of C of the hard layer is 0.4 mass % or less, an amount of N of the hard layer is 0.02 mass %, a standard deviation of a variation of hardness at a depth of 10 μm from the surface of the hard layer is 2.0 or less, an average micro-Vickers hardness of the inner layer is 80 HV or more and less than 400 HV, a volume rate of carbides contained in the inner layer is less than 2.00%, and the average micro-Vickers hardness of the hard layer is 1.05 times or more the average micro-Vickers hardness of the inner layer.

(2) The steel sheet according to claim 1, wherein the hard layer contains, by mass %, C: 0.03 to 0.35%, Si: 0.01 to 3.00%, Mn: 0.70 to 10.00%, P: 0.0200% or less, S: 0.0200% or less, Al: 0.500% or less, N: 0.0200% or less, O: 0.0200% or less, Ti: 0 to 0.500%, B: 0 to 0.0100%, Cr: 0 to 2.000%, Mo: 0 to 1.000%, Nb: 0 to 0.500%, V: 0 to 0.500%, Cu: 0 to 0.500%, W: 0 to 0.100%, Ta: 0 to 0.100%, Ni: 0 to 0.500%, Sn: 0 to 0.050%, Sb: 0 to 0.050%, As: 0 to 0.050%, Mg: 0 to 0.0500%, Ca: 0 to 0.050%, Y: 0 to 0.050%, Zr: 0 to 0.050%, La: 0 to 0.050%, Ce: 0 to 0.050% and a balance of Fe and impurities and the inner layer contains, by mass %, C: 0.001 to 0.300%, Si: 0.01 to 3.00%, Mn: 0.10 to 3.00%, P: 0.0200% or less, S: 0.0200% or less, Al: 0.500% or less, N: 0.0200% or less, O: 0.0200% or less, Ti: 0 to 0.500%, B: 0 to 0.0100%, Cr: 0 to 2.000%, Mo: 0 to 1.000%, Nb: 0 to 0.500%, V: 0 to 0.500%, Cu: 0 to 0.500%, W: 0 to 0.100%, Ta: 0 to 0.100%, Ni: 0 to 0.500%, Sn: 0 to 0.050%, Sb: 0 to 0.050%, As: 0 to 0.050%, Mg: 0 to 0.0500%, Ca: 0 to 0.050%, Y: 0 to 0.050%, Zr: 0 to 0.050%, La: 0 to 0.050%, Ce: 0 to 0.050% and a balance of Fe and impurities.

Advantageous Effects of Invention

According to the present invention, by forming on one or both surfaces of steel sheet a hard layer with an average micro-Vickers hardness of 240 HV or more and less than 400 HV and a variation in hardness at a depth of 10 μm from the surface of a standard deviation of 2.0 or less and, furthermore, by controlling the amounts of C and N of the hard layer to suitable values, making the average micro-Vickers hardness of the inner layer 80 HV or more and less than 400 HV, controlling the volume rate of carbides contained in the inner layer to less than 2.00%, and making the average micro-Vickers hardness of the hard layer 1.05 times or more the average micro-Vickers hardness of the inner layer, it is possible to provide steel sheet for cold forming use excellent in fatigue characteristics and to provide a method for producing the same.

BRIEF DESCRIPTION OF DRAWINGS

FIG. 1 is a view showing the relationship between a thickness of a hard layer and a fatigue limit ratio.

DESCRIPTION OF EMBODIMENTS

Below, the present invention will be explained in detail.

First, the reasons for limiting the thicknesses, constituents, and average micro-Vickers hardnesses of the hard layer and inner layer and the standard deviation of nanohardness of the hard layer will be explained. Here, the "%" of the constituents means mass %.

The thickness of the hard layer present on one or both surfaces of the inner layer is made 20 μm or more per side or 40% or less of the total sheet thickness. If the thickness of the hard layer is less than 20 μm, the thickness of the hard layer is thin and when receiving repeated stress, peeling of the hard layer is invited and excellent fatigue characteristics can no longer be obtained. For this reason, the thickness of the hard layer is made 20 μm or more. Further, if the thickness of the hard layer exceeds 40% of the total sheet thickness, that is, at the time of cold forming, the stress applied to the hard layer increases and the merit of improvement of the cold formability by the formation of multilayers can no longer be obtained. For this reason, the thickness of the hard layer is made 40% or less of the total sheet thickness. More preferably, the thickness of the hard layer is 30 μm to 30%.

The thicknesses of the hard layer and the inner layer are measured by an optical microscope. A sample covered by the measurement is buried in diameter 30 mm cylindrically shaped epoxy resin. #80 to 1000 polishing paper is used for rough polishing by wet polishing, then diamond abrasives having 3 μm and 1 μm average particle sizes are used to finish this to a mirror surface. Note that, the polishing by the 1 μm diamond particles is performed under the conditions of application of a 1N to 10N load and holding for 30 to 600 seconds on a polishing table rotating by a 30 to 120 mpm speed.

At the hard layer and the inner layer, there is a difference in hardness, so in the polishing by the above 1 μm diamond particles, a difference arises in the amount of polishing. Due to this, a slight step difference is formed at the boundary of the hard layer and the inner layer. By examination using an optical microscope, it is possible to find the boundary between the hard layer and the inner layer and the thicknesses of the layers and ratios in the sheet thickness. Note that, if the step difference caused by the finish polishing is slight, examination by differential interference of the optical microscope is preferable.

The average micro-Vickers hardness of the hard layer is made 240 HV or more and less than 400 HV. If the average micro-Vickers hardness is less than 240 HV, the hardness of the hard layer is low and excellent fatigue characteristics can no longer be obtained. For this reason, the average micro-Vickers hardness of the hard layer is made 240 HV or more. On the other hand, if the average micro-Vickers hardness of the hard layer is 400 HV or more, the hard layer is excessively high in strength, so the cold formability remarkably deteriorates. For this reason, the average micro-Vickers hardness of the hard layer is made less than 400 HV. More preferably, it is 255 HV or more.

The amount of C contained in the hard layer is made 0.4% or less and the amount of N is made 0.02% or less. C and N are elements remarkably suppressing cross slip in the steel at the time of cold forming. Cross slip has the effect of suppressing accumulation and integration of dislocations introduced into the steel at the time of imparting strain. If the amount of C exceeds 0.4% or the amount of N exceeds 0.02%, cross slip is remarkably suppressed and excessive accumulation and integration of dislocations are invited at the time of cold forming. As a result, voids are formed in the low strain region. These voids connect and lead to macroscopic fracture, so the cold formability deteriorates. For this reason, the amount of C contained in the hard layer is made 0.4% or less or the amount of N is made 0.02% or less. More preferably, the amount of C is made 0.38% or less or the amount of N is made 0.018% or less.

The average micro-Vickers hardness of the inner layer is made 80 HV or more and less than 400 HV. If the average micro-Vickers hardness is less than 80 HV, the difference in hardness with the hard layer becomes larger, so at the time of cold forming, strain excessively concentrates at the inner layer side, cracks form at the hard layer/inner layer interface, and poor shape of the product after cold forming is invited. For this reason, the average micro-Vickers hardness of the inner layer is made 80 HV or more. Further, if the average micro-Vickers hardness is 400 HV or more, the difference in hardness of the hard layer and the inner layer becomes smaller, so the effect of easing the concentration of strain at the hard layer at the time of cold forming is lost and the cold formability deteriorates. For this reason, the average micro-Vickers hardness of the inner layer is made less than 400 HV. More preferably, it is 90 HV or more and less than 380 HV.

The volume rate of the carbides of the inner layer is made less than 2.00%. Carbides become sites for cracking or formation of voids at the time of cold forming. If 2.00% or more, connection of the cracks or voids is promoted and macroscopic fracture is promoted. For this reason, the upper limit of the volume ratio of carbides of the inner layer is made less than 2.00%. More preferably, it is less than 1.90%. Note that, "carbides" include the compound of iron and carbon of cementite ($Fe_3C$) and also compounds and alloy compounds in which the Fe atoms in the cementite are replaced with Mn, Cr, and other alloy elements ($M_{23}C_6$, $M_6C$, MC. Note that, M is Fe and another metal element added for alloying).

The average micro-Vickers hardness of the hard layer is made 1.05 times or more the average micro-Vickers hardness of the inner layer. The fatigue strength of the steel sheet can be improved by controlling the ratio of the hardness of the hard layer and the hardness of the inner layer. By making the average micro-Vickers hardness of the hard layer 1.05 times or more the average micro-Vickers hardness of the inner layer, the fatigue limit ratio (=fatigue strength/tensile strength) can be made 0.50 or more. More preferably, it is 1.08 times or more at least at one surface.

The standard deviation of nanohardness of the hard layer is made 2.0 or less. This is because by suppressing variation of the nanohardness of the hard layer, the cold formability is remarkably improved. If the standard deviation exceeds 2.0, for example, at the time of cold roll forming, cracks sometime are formed. From this viewpoint, the standard deviation is made 2.0. 1.6 or less is preferred. The lower limit of the standard deviation is not designated, but suppressing this to 0.2 or less is technically difficult.

Variation in nanohardness of the hard layer in the sheet thickness direction does not affect the cold formability. Even if there is a gradient of hardness in the sheet thickness direction, the effect of the present invention is not impaired. Note that, if the variation in nanohardness on the line vertical to the sheet thickness direction and parallel to the rolling direction is large, the cold formability falls.

The steel sheet of the present embodiment is not particularly limited in constituents so long as the above-mentioned inner layer and hard layer are provided. Below, examples of the chemical constituents suitable for the hard layer and the inner layer of the steel sheet of the present embodiment will be explained. Here, the "%" of the constituents means mass %.

First, the suitable constituents of the hard layer will be explained.

C: 0.03 to 0.35%

C is an element effective for strengthening the steel. To secure the fatigue characteristics of a part by quenching and tempering or other heat treatment, the amount of C is preferably made 0.03% or more. 0.10% or more is more preferable. If the amount of C becomes greater, cracking easily occurs at the time of cold forming, so making this 0.35% or less is preferable. More preferably, it is 0.30% or less.

Si: 0.01 to 3.00%

Si is an element which acts as a deoxidant and further has an effect on the morphology of the carbides and residual austenite after heat treatment. For realizing both fatigue characteristics and cold formability, it is effective to reduce the volume rate of carbides present in the steel part and, furthermore, to make active use of the residual austenite to increase the strength. To obtain this effect, 0.01% or more of Si is preferably contained. If the content of Si is too great, the steel part becomes brittle and the cold formability is liable to fall, so the content is preferably made 3.00% or less. More preferably, it is 0.10% to 2.50%, still more preferably 0.20% to 2.00%.

Mn: 0.70 to 10.00%

Mn is an element which acts as a deoxidant and, further, is effective for suppressing pearlite transformation of the steel. To suppress pearlite transformation and raise the structural ratio of martensite in the process of cooling from the austenite region to secure strength and fatigue characteristics, the amount of Mn is preferably made 0.70% or more. 2.00% or more is more preferable. If the amount of Mn is too great, coarse Mn oxides become present in the steel and become starting points for fracture at the time of cold forming whereby the cold formability deteriorates. For this reason, the amount of Mn is preferably made 10.00% or less. More preferably, it is 8.00% or less.

P: 0.0200% or Less

P is not an essential element. For example, it is contained in the steel as an impurity and strongly segregates at the ferrite grain boundaries causing the grain boundaries to become brittle. For this reason, the smaller the content, the better. 0 is also possible. However, if reducing this to less than 0.0001% in the refining process to increase the purity of the steel, the time required for refining becomes longer and the cost greatly increases, so the realistic lower limit is 0.0001%. If considering the cost aspects, 0.0010% or more may be contained. If the amount of P becomes greater, grain boundary embrittlement causes the cold formability to fall, so making this 0.0200% or less is preferable. More preferably, it is 0.0190% or less.

S: 0.0200% or Less

S is not an essential element and is for example contained in the steel as an impurity. In the steel, it forms MnS and other nonmetallic inclusions and invites an increase in hardness and drop in ductility of the steel part. Further, due to the formation of nonmetallic inclusions greatly different in hardness from the steel in the steel, the variation in hardness near the surface of the hard layer becomes greater. For this reason, the smaller the content, the better. 0 is also possible. If reducing this to less than 0.0001% in the refining process to increase the purity of the steel, the time required for refining becomes longer and the cost greatly increases, so the realistic lower limit is 0.0001%. If considering the cost aspects, 0.0010% or more may be contained. If the amount of S becomes greater, cracks occur starting from the nonmetallic inclusions at the time of cold forming and further the hardness increases, so the cold formability falls, so making this 0.0200% or less is preferable. More preferably, it is 0.0190% or less.

Al: 0.500% or Less

Al is an element acting as a deoxidant of steel, stabilizing the ferrite, and increasing the hardness. It is not an essential element and is added in accordance with need. To obtain the effect of addition, the content is preferably made 0.001% or more. Making it 0.010% or more is more preferable. If the amount of Al becomes greater, coarse Al oxides are formed, an increase in hardness and a drop in cold formability are caused, and, further, nonmetallic inclusions greatly different in hardness from the steel are formed in the steel, so the variation in hardness near the surface of the hard layer becomes greater, therefore making it 0.500% or less is preferable and making it 0.450% or less is more preferable.

N: 0.0200% or Less

N, like C, is an element effective for strengthening steel, but is also an element affecting the occurrence of cross slip of dislocations at the time of cold forming. It is not an essential element. From the viewpoint of securing the cold formability, the smaller the content, the better. 0 is also possible. However, if reducing this to less than 0.0001%, the refining costs increase, so the realistic lower limit is 0.0001%. 0.0010% or more may also be contained. If the amount of N becomes greater, it is not possible to suppress the concentration of strain at the time of cold forming and formation of voids is caused, so the cold formability remarkably drops. For this reason, the amount of N is preferably made 0.0200% or less. More preferably, it is 0.0150% or less.

O: 0.0200% or Less

O is an element forming oxides in steel and inviting an increase in hardness. Further, due to the formation of nonmetallic inclusions greatly different in hardness from the steel in the steel, the variation in hardness near the surface of the hard layer becomes greater. This is not an essential element. Oxides present in the ferrite grains become sites for the formation of voids and further become structural factors inviting an increase in hardness, so the smaller the amount of O, the more preferable. 0 is also possible. However, if reducing this to less than 0.0001%, the refining costs increase, so the realistic lower limit is 0.0001%. 0.0005% or more may also be contained. If the amount of O becomes greater, due to the increase in hardness, the cold formability drops, so making this 0.0200% or less is preferable. More preferably, it is 0.0170% or less.

The following elements are not essential elements but are optional elements which may be suitably included in the steel sheet and steel up to the limits of predetermined amounts.

Ti: 0 to 0.500%

Ti is an element controlling shape of carbides and increasing the strength of the ferrite by inclusion in large amounts. However, from the viewpoint of securing the cold formability, the smaller the content, the better. 0 is also possible. If reducing the amount of Ti to less than 0.001%, the refining costs increase, so the realistic lower limit is 0.001%. 0.005% or more may also be contained. If the amount of Ti becomes greater, coarse Ti oxides or TiN become present in the steel and the cold formability falls, so making this 0.500% or less is preferable. More preferably, it is 0.450% or less.

B: 0 to 0.0100%

B is an element suppressing the formation of ferrite and pearlite from austenite in the cooling process and promoting the formation of bainite or martensite or other low temperature transformed structures. Further, B is an element advantageous for making the steel high strength and is added in accordance with need. To sufficiently obtain the effect of increasing the strength or improving the fatigue characteristics by addition, the amount of B is preferably made 0.0001% or more. 0.0005% or more is more preferable. If the amount of B becomes greater, formation of coarse B oxides in the steel is invited. These become starting points for formation of voids at the time of cold forming and cause the cold formability to deteriorate, so making this 0.0100% or less is preferable. More preferably, it is 0.0050% or less.

Cr: 0 to 2.000%

Cr, like Mn, is an element which suppresses pearlite transformation and is effective for making the steel high strength and is added in accordance with need. To obtain the effect of addition, 0.001% or more is preferably added. 0.010% or more is more preferable. If the amount of Cr becomes greater, coarse Cr carbides are formed at the center segregated part and the cold formability falls, so making this 2.000% or less is preferable. More preferably, it is 1.500% or less.

Mo: 0 to 1.000%

Mo, like Mn and Cr, is an element effective for strengthening steel and is added in accordance with need. To obtain the effect of addition, 0.001% or more is preferably added. 0.010% or more is more preferable. If the amount of Mo becomes greater, coarse Mo carbides are formed and the cold workability falls, so making this 1.000% or less is preferable. More preferably, it is 0.700% or less.

Nb: 0 to 0.500%

Nb, like Ti, is an element effective for controlling shape of carbides and is an element effective also for improvement of the toughness since addition refines the structure. To obtain the effect of addition, 0.001% or more is preferably added. 0.002% or more is more preferable. If the amount of Nb becomes greater, a large number of fine, hard Nb carbides precipitate, the strength of the steel material rises, the ductility remarkably deteriorates, and the cold workability falls, so making this 0.500% or less is preferable. More preferably, it is 0.200% or less.

V: 0 to 0.500%

V also, like Nb, is an element effective for controlling shape of carbides and is an element effective also for improvement of the toughness since addition refines the structure. To obtain the effect, 0.001% or more is preferably added, 0.002% or more is more preferable. If the amount of V becomes greater, a large number of fine V carbides precipitate, the strength of the steel material rises, the ductility falls, and the cold formability falls, so making this 0.500% or less is preferable. More preferably, it is 0.400% or less.

Cu: 0 to 0.500%

Cu is an element effective for increasing the strength of the steel material and is added in accordance with need. To effectively obtain the effect of increase of strength, a content of 0.001% or more is preferable. 0.002% or more is more preferable. If the amount of Cu becomes greater, red hot embrittlement is invited and the productivity in hot rolling falls, so making this 0.500% or less is preferable. More preferably, it is 0.400% or less.

W: 0 to 0.100%

W also, like Nb and V, is an element effective for controlling shape of carbides and increase of strength of the steel and is added in accordance with need. To obtain the effect, 0.001% or more is preferably added. 0.002% or more is more preferable. If the amount of W becomes greater, a large number of fine W carbides precipitate, the strength of the steel material rises, the ductility falls, and the cold workability falls, so making this 0.100% or less is preferable. More preferably, it is 0.080% or less.

Ta: 0 to 0.100%

Ta also, like Nb, V, and W, is an element effective for controlling shape of carbides and increase of strength and is added in accordance with need. To obtain the effect, 0.001% or more is preferably added. 0.002% or more is more preferable. If the amount of Ta becomes greater, a large number of fine Ta carbides precipitate, the strength of the steel material rises, the ductility falls, and the cold workability falls, so making this 0.100% or less is preferable. More preferably, it is 0.080% or less.

Ni: 0 to 0.500%

Ni is an element effective for improving the fatigue characteristics of the part and is added in accordance with need. To effectively obtain this effect, inclusion of 0.001% or more is preferable. 0.002% or more is more preferable. If the amount of Ni becomes greater, the ductility falls and the cold formability falls, so making this 0.500% or less is preferable. More preferably, it is 0.400% or less.

Sn: 0 to 0.050%

Sn is an element which is contained in steel when using scrap as the raw material. The smaller the amount, the more preferable. 0 is also possible. However, if reducing this to less than 0.001%, the refining costs increase, so the realistic lower limit is 0.001%. Inclusion of 0.002% or more is also possible. If the amount of Sn becomes greater, the embrittlement of the ferrite causes the cold formability to drop, so making this 0.050% or less is preferable. More preferably, it is 0.040% or less.

Sb: 0 to 0.050%

Sb, like Sn, is an element contained when using scrap as the steel raw material. Sb strongly segregates at the grain boundaries and invites embrittlement of the grain boundaries and a drop in ductility, so the smaller the content, the more preferable. 0 is also possible. However, if reducing this to less than 0.001%, the refining costs increase, so the realistic lower limit is 0.001%. Inclusion of 0.002% or more is also possible. If the amount of Sb becomes greater, the cold formability falls, so making this 0.050% or less is preferable. More preferably, it is 0.040% or less.

As: 0 to 0.050%

As, like Sn and Sb, is an element contained when using scrap as the steel raw material and strongly segregating at the grain boundaries. The smaller the content, the more preferable. 0 is also possible. However, if reducing this to less than 0.001%, the refining costs increase, so the realistic lower limit is 0.001%. Inclusion of 0.002% or more is also possible. If the amount of As becomes greater, the cold formability falls, so this is made 0.050% or less. More preferably, it is 0.040% or less.

Mg: 0 to 0.0500%

Mg is an element able to control shape of sulfides by addition in a trace amount and is added in accordance with need. To obtain this effect, 0.0001% or more is preferably added. 0.0005% or more is more preferable. If the amount of Mg becomes greater, coarse inclusions are formed and cause a drop in cold formability, so making this 0.0500% is preferable. More preferably, it is 0.0400% or less.

Ca: 0 to 0.050%

Ca, like Mg, is an element able to control shape of sulfides by addition in a trace amount and is added in accordance with need. To obtain this effect, 0.001% or more is preferably added. 0.002% or more is more preferable. If the amount of Ca becomes greater, coarse Ca oxides are formed and become starting points for cracking at the time of cold forming, so making this 0.050% or less is preferable. More preferably, it is 0.040% or less.

Y: 0 to 0.050%

Y, like Mg and Ca, is an element able to control shape of sulfides by addition in a trace amount and is added in accordance with need. To obtain this effect, 0.001% or more is preferably added. 0.002% or more is more preferable. If the amount of Y becomes greater, coarse Y oxides are formed and the cold formability falls, so making this 0.050% or less is preferable. More preferably, it is 0.040% or less.

Zr: 0 to 0.050% or Less

Zr, like Mg, Ca, and Y, is an element able to control shape of sulfides by addition in a trace amount and is added in accordance with need. To obtain this effect, 0.001% or more is preferably added. 0.002% or more is more preferable. If the amount of Zr becomes greater, coarse Zr oxides are formed and the cold formability falls, so making this 0.050% or less is preferable. More preferably, it is 0.040% or less.

La: 0 to 0.050%

La is an element effective for controlling shape of sulfides by addition in a trace amount and is added in accordance with need. To obtain this effect, 0.001% or more is preferably added. 0.002% or more is more preferable. If the amount of La becomes greater, La oxides are formed and the cold formability falls, so making this 0.050% is preferable. More preferably, it is 0.040% or less.

Ce: 0 to 0.050%

Ce, like La, is an element able to control shape of sulfides by addition in a trace amount. Further, it is an element which strongly segregates at the grain boundaries and lowers the number ratio of grain boundary carbides and is added in accordance with need. To obtain this effect, 0.001% or more is preferably added, 0.002% or more is more preferable. If the amount of Ce becomes greater, the drop in the number ratio of grain boundary carbides causes the workability to drop, so making this 0.050% or less is preferable. More preferably, it is 0.046% or less.

Furthermore, one example of the chemical constituents suitable for the steel sheet of the inner layer will be explained.

C: 0.001 to 0.300%

C is an element effective for strengthening the steel. To control the average micro-Vickers hardness of the inner layer to 80 HV or more, 0.001% or more is preferably added. 0.002% or more is more preferable. If the amount of C becomes greater, an excessive increase in strength of the inner layer or formation of carbides is invited and the cold formability falls, so making this 0.300% or less is preferable. More preferably, it is 0.200% or less.

Mn: 0.10 to 3.00%

Mn is an element acting as a deoxidant and further is effective for control of the strength of the steel. If the amount of Mn is small, in the solidification process at the time of continuous casting, the solidification starts from a high temperature. Along with this, segregation at the center part is aggravated. Further, at the time of cold forming, cracks form from this center segregated part and the cold formability falls. For this reason, making this 0.10% or more is preferable. 0.30% or more is more preferable. If the amount of Mn becomes greater, an excessive increase in strength is invited and the cold formability deteriorates, so making this 3.00% or less is preferable. More preferably, it is 2.60% or less.

The inner layer may contain, in addition to the above C and Mn, Si, P, S, Al, N, Cr, Mo, O, Ti, B, Nb, V, Cu, W, Ta, Ni, Sn, Sb, As, Mg, Ca, Y, Zr, La, and Ce. The ranges of addition and the effects are the same as the hard layer.

Note that, in the hard layer and the inner layer in the steel sheet of the present invention, the balances in addition to the above constituents are Fe and impurities.

The steel sheet of the present invention is provided with an inner layer and a hard layer formed on one or both surfaces of the inner layer, has a thickness of the hard layer of 20 µm or more and 40% or less of the total sheet thickness, has an average micro-Vickers hardness of the hard layer of 240 HV or more and less than 400 HV, has an amount of C of the hard layer of 0.4% or less and has an amount of N of 0.02% or less, has an average micro-Vickers hardness of the inner layer of 80 HV or more and less than 400 HV, has a volume rate of carbides contained in the inner layer of less than 2.00%, and has an average micro-Vickers hardness of the hard layer of 1.05 times or more the average micro-Vickers hardness of the inner layer. The fact that, due to this, both excellent cold formability and fatigue characteristics are obtained is a new discovery found by the inventors.

Next, the method of examination and measurement of the structure will be explained.

The volume rate of the carbides is measured by the electrolytic extraction replica method. The steel material is placed on electrodes made of platinum and serving also as a sample support and is immersed in an electrolytic solution. A potential leaving only carbides undissolved is applied and a 0.1 μm mesh is used to obtain the residue of carbides. The volume ratio of carbides present in the steel is found from the weight of the sample used for the electrolytic extraction and the amount of residue of carbides.

The average micro-Vickers hardness of the steel sheet is found by measuring the load 0.098N micro-Vickers hardnesses of the hard layer and inner layer at ¼ thickness positions from the surface sides of the hard layer and the inner layer at respectively 12 points and determining the average values of 10 points while discarding the hardest data and the softest data. Note that, with a load of 0.098 N, the diagonal length of the dent in the case of 240 HV is about 9 μm and the length in the case of 400 HV is about 7 μm. The hardness of the hard layer having a 20 μm or so thickness can be suitably evaluated.

The standard deviation of nanohardness of the hard layer has to be found from the line vertical to the sheet thickness direction of a sheet thickness cross-section and parallel to the rolling direction. In the present invention, "the standard deviation of the nanohardness of the hard layer" means the standard deviation of a fitting curve when measuring the nanohardness at 100 locations at 10 μm positions from the surface side of the hard layer in the sheet thickness direction and 3 μm intervals in the rolling direction using a nanoindenter (Ti-900) made by Hysitron under conditions of an indentation depth of 80 nm, preparing a histogram from the obtained hardness data, and approximating the histogram by normal distribution. Here, the standard deviation of nanohardness of the hard layer evaluates the difference in hardness between microstructures, so is found not by a Vickers hardness test, but by a hardness test using a nanoindenter with a small area of the region for evaluation of hardness.

Next, the method of evaluation of the cold formability will be explained. With an inside bending radius of 4 mm, roll forming was used to impart a 90° bend to a sample, then the bent corner part was checked for cracks by examination of the cross-sectional structure. The sample was buried in epoxy resin, then was roughly polished by emery wet polishing, then 3 μm and 1 μm size diamond particles were used to polish the sample cross-section to a mirror finish. Next, without etching, an optical microscope was used to examine the cross-sectional structure by a magnification of 1000×. If the lengths of the fractures and cracks found were less than 5 μm, it is judged that the cold workability was excellent. Further, if the lengths of the fractures and cracks found were 5 μm or more, it is judged that the cold formability was poor.

The fatigue characteristics of the steel sheet were evaluated by performing a plane bending fatigue test in accordance with the method described in JIS Z2275 under conditions of a stress ratio of −1 and determining the 2,000,000 fatigue limit, then the fatigue limit/tensile strength was calculated as the fatigue limit ratio and used as the evaluation number. In the steel sheet of the present embodiment, if the fatigue limit ratio is 0.45 or more, it is judged that the fatigue characteristics are excellent.

Next, the method for producing the steel sheet of the present invention will be explained. The following explanation is meant to illustrate the characteristic method for producing the steel sheet of the present invention and is not meant to limit the steel sheet of the present invention to the multi-layer steel sheet obtained by bonding the inner layer and hard layer as explained below.

For example, at the time of production of the steel strip, it is also possible to produce the steel sheet provided with an inner layer and hard layer in the present invention by treating the surface of a single layer steel sheet to harden the surface layer part. By hardening the surface layer part by surface treatment at the time of production of the steel strip in this way, it is possible to solve the problem of the drop in dimensional accuracy which occurred when performing surface treatment after forming a part.

The method for producing the steel sheet of the present invention is characterized by bonding a hard layer which is excellent in fatigue characteristics to one or both surfaces of an inner layer which is soft and excellent in cold workability and by controlling the strengths, constituents, and structures of these hard layer and inner layer to the optimum states. Further, as such a method of production, while not particularly limited to this, for example, the diffusion heat treatment method using blanks of thin steel sheets and hot rolling, cold rolled annealing, plating, and other treatment using a slab comprised of various types of steel of the hard layer and inner layer bonded by electrical resistance welding may be mentioned. The specific method of production is as follows:

First, the method of producing a steel material by the diffusion heat treatment method using blanks of thin steel sheets will be explained.

Thin steel sheets corresponding to the hard layer and the inner layer which were adjusted to predetermined constituents and shapes and produced by the electric furnace or blast furnace method were used. The oxides at the bonding surfaces of the hard layer and the inner layer were removed by pickling, the surfaces of the bonding surfaces were polished by #50 to #1000 grindstones or polishing paper, then ultrasonic cleaning was used to remove the dirt, the sheets were superposed, a load was placed from the top surface, and the sheets were inserted into a heating furnace in that state.

At this time, by using as the steel sheet corresponding to the hard layer a steel sheet with an average micro-Vickers hardness of 1.05 times or more the steel sheet corresponding to the inner layer, it is possible to obtain a multi-layer steel sheet with an average micro-Vickers hardness of the hard layer of 1.05 times or more the average micro-Vickers hardness of the inner layer.

The thicknesses of the materials of the hard layer and the inner layer used for bonding are preferably made 0.1 mm or more. If less than 0.1 mm, the residual stress introduced in the materials in the polishing step after pickling causes warping and clearance to occur at the time of charging the materials into the heating furnace and sometimes the hard layer and the inner layer to not be bonded with a sufficient strength. For this reason, the thicknesses of these are preferably 0.1 mm or more. On the other hand, there are no upper limits to the thicknesses of the materials. Even if 100 mm or more, there is no technical problem from the viewpoint of bonding except that the weights of the materials increase and the work becomes more difficult.

In the polishing step, #50 to #1000 grindstone or polishing paper is preferably used. In the case of less than #50, the surface roughness degrees of the materials are low and contact between the hard layer and the inner layer at the time of diffusion heat treatment is insufficient, so sometimes a sufficient bonding strength cannot be obtained after heat treatment. For this reason, the lower limit of the grindstone or polishing paper used for the polishing is preferably #50. Further, if using a grindstone or polishing paper of over #1000 number to polish the materials of the hard layer and the inner layer, the skill of experienced workers is required for finishing the polishing surfaces flat and the work efficiency falls. In addition, even if using a #1000 or higher number for polishing, no remarkable improvement in the bonding strength can be recognized, so the upper limit of the number used for the polishing is preferably #1000. More preferably, it is #80 to #600.

The temperature of the heating furnace is preferably 800° C. to 1300° C. With a temperature of the heating furnace of less than 800° C., the diffusion of elements between the hard layer and the inner layer is insufficient and a sufficient bonding strength cannot be obtained, so the lower limit of the heating temperature is preferably 800° C. or more. On the other hand, if the heating temperature exceeds 1300° C., oxygen excessively penetrates the clearance between the hard layer and the inner layer and coarse oxides are formed between the hard layer and the inner layer, so the bonding strength falls. For this reason, the upper limit of the heating temperature is preferably 1300° C. or less. More preferably, it is 850° C. to 1200° C.

The holding time in the heating furnace is preferably 15 minutes to 300 minutes. With a holding time of less than 15 minutes, a sufficient bonding strength cannot be obtained between the hard layer and the inner layer, so the lower limit is preferably 15 minutes or more. On the other hand, with holding for over 300 minutes, oxides are formed between the hard layer and the inner layer and the bonding strength falls, so the upper limit of the holding time is preferably 300 minutes or less. More preferably, it is 30 minutes to 180 minutes.

At the stage of insertion into the heating furnace and holding, the contact pressure applied to the material is preferably 10 MPa or more. With a contact pressure of less than 10 MPa, a sufficient bonding strength cannot be obtained, so the lower limit of the contact pressure is preferably 10 MPa or more. Note that, the higher the contact pressure, the more preferable. For example, a 200 MPa or so contact pressure may also be given.

The multi-layer material after heating and cooling may be further heat treated after removing the load. The heat treatment is for example heating to 800 to 1000° C., holding there for 1 to 60 minutes, then cooling. As the cooling, for example, water cooling, oil cooling, and air cooling may be used. The faster the cooling rate in this heat treatment, the higher the hard layer and the inner layer in hardness, so it is possible to suitably set the cooling rate in accordance with the hardnesses of the steel sheets of the materials used for the hard layer and the inner layer and the hardness of the multi-layer steel sheet trying to be finally obtained.

Next, the method for producing a steel strip satisfying the requirements of the present invention through the steps of hot rolling or hot rolling, pickling, cold rolling, and annealing using a multi-layer slab comprised of an inner layer on which a hard layer is superposed will be explained.

The method for producing the multi-layer slab is not particularly limited. For example, either the continuous casting method or slab welding method may be used. In the continuous casting method, a casting machine provided with two tundishes is used. First an inner layer side casting positioned at the center part is produced, then molten steel corresponding to the hard layer and with constituents different from the inner layer side is poured from the second tundish so as to cover the inner layer side casting. The assembly is continuously solidified to obtain a multi-layer state slab. Alternatively, in the slab welding method, slabs cast to predetermined compositions or roughly rolled materials produced from slabs are polished at the bonding surfaces by machine scarfing etc., then are washed by acid and alcohol to remove the oxides and contaminants and then stacked. Furthermore, the top and bottom surfaces of this multilayer slab are sandwiched between high temperature slabs just finished being cast so as to promote diffusion bonding by heat from the high temperature slabs.

The multi-layer slab produced by the method illustrated above is used to produce a multi-layer steel strip by a usual hot rolling process.

Hot Rolling

The above-mentioned multi-layer slab is continuously cast, then is rolled while hot as is or after heating after cooling once. At this time, it is heated at 1100° C. to 1300° C. for 1 minute to 300 minutes, then is finish hot rolled ending in the 650° C. to 950° C. temperature region. The finish rolled steel strip is cooled on a ROT, then coiled at a 100° C. to 700° C. temperature range to obtain a hot rolled coil. Below, the method for producing the steel sheet of the present invention will be specifically explained.

The heating temperature of the slab is 1100° C. to 1300° C. If the heating temperature exceeds 1300° C. or the heating time exceeds 300 minutes, remarkable oxidation proceeds between the hard layer and the inner layer and the hard layer and inner layer easily peel apart, so a drop in the fatigue characteristics and a drop in the cold formability are caused. Furthermore, oxides are formed inside the hard layer, so the variation in hardness at the top and bottom layers of the multi-layer steel strip becomes greater. For this reason, preferably the upper limit of the heating temperature is 1300° C. or less and the upper limit of the soaking time is 300 minutes or less. Preferably, the heating temperature is 1250° C. or less and the soaking time is 270 minutes or less.

It is important that the slab be heated to 1100 to 1300° C. in range and held there for 1 to 300 minutes. In addition, for example, there may be a dwell time in a lower temperature range.

The finish hot rolling is ended at 650° C. to 950° C. If the finish hot rolling temperature is less than 650° C., due to the increase of the deformation resistance of the steel material, the rolling load remarkably rises. Further, an increase in the amount of roll wear is invited and a drop in the productivity is caused. For this reason, the lower limit is made 650° C. or more. Further, if the finish hot rolling temperature exceeds 950° C., flaws due to the thick scale formed in the middle of passing through the RunOutTable are formed at the steel sheet surface and cause a drop in the fatigue characteristics. Furthermore, along with the higher finish rolling temperature, the structure becomes mixed particles, so the variation in hardness of the top and bottom layers of the multi-layer steel strip becomes greater. For this reason, the upper limit is made 950° C. or less. More preferably, it is 800° C. to 930° C.

The cooling rate of the steel strip at the ROT after finish hot rolling is preferably 10° C./s to 100° C./s. With a cooling rate of less than 10° C./s, it is not possible to prevent the formation of thick scale in the middle of cooling and the occurrence of flaws due to the same, and a drop in the surface appearance is invited. For this reason, the lower limit is preferably made 10° C./s or more. Further, if cooling the steel strip from the surface to the inside of the steel sheet by a cooling rate exceeding 100° C./s, the surface most layer is excessively cooled and bainite, martensite, and other low temperature transformed structures are formed. When paying out a coil cooled to room temperature after coiling, fine cracks form at the above-mentioned low temperature transformed structures. It is difficult to remove these cracks even in the succeeding pickling step. These cracks become starting points of fracture and cause fracture of the steel strip in production and a drop in productivity. For this reason, the upper limit is preferably made 100° C./s or less. Note that the cooling rate defined above indicates the cooling ability obtained from the cooling facilities between the spray zones from the point of time when the finish hot rolled steel strip is water cooled in a spray zone after passing through a non-spray zone to the point of time when it is cooled on the ROT to the target temperature of coiling. It does not show the average cooling rate from the spray start point to the temperature of coiling by the coiling machine. More preferably, it is 20° C./s to 90° C./s.

The coiling temperature is made 50° C. to 700° C. If the coiling temperature is less than 50° C., transformation is substantially completed before coiling and a large residual stress remains in the sheet thickness direction. Due to this residual stress, the cold formability remarkably falls. Further, if applying cold rolling, deterioration of the sheet shape is invited. Therefore, the lower limit of the coiling temperature is made 50° C. or more. Further, if the coiling temperature exceeds 700° C., the predetermined strength cannot be secured at the hard layer and the inner layer after hot rolling. In addition, formation of a large amount of carbides in the inner layer part is invited and a drop in the cold formability is caused. For this reason, the upper limit of the coiling temperature is made 700° C. or less. More preferably, it is 100° C. to 680° C.

The embodiment of the present invention cannot be obtained by the general carburizing, nitriding, soft nitriding, induction surface hardening, etc. of conventional surface layer reforming. The reason is that with carburizing, nitriding, soft nitriding, and other heat treatment techniques, excessive carbon and nitrogen are allowed to penetrate the surface layer, so the cold formability falls. Further, with induction surface hardening and other such art, carbides remain at the center in sheet thickness, so the cold formability falls.

The above hot rolled steel strip may be pickled and cold rolled and cold rolled annealed or hot rolled annealed, then cold rolled and cold rolled annealed so as to produce cold rolled steel strip provided with both cold formability and fatigue characteristics.

Pickling

The type of acid used in the pickling is not particularly designated. The purpose of the pickling is the removal of the oxide scale formed on the surface of the steel strip after hot rolling. Either hydrochloric acid pickling or sulfuric acid pickling may be used. Furthermore, even if adding a chemical pickling promoter to the pickling solution or adjusting vibration or tension or applying other mechanical action to promote pickling, there is no affect at all on the fundamental art of the present invention.

Cold Rolling

The rolling reduction in cold rolling is preferably 20% to 80%. With a rolling reduction of less than 20%, the load applied at each stand of the tandem rolling machine becomes smaller, so obtaining a grasp of and controlling the sheet shape become difficult and a drop in the productivity is invited. Further, if the rolling reduction exceeds 80%, the load given at each stand remarkably increases. Along with this, the Hertz stress occurring at the rolls excessively rises, so a drop in roll lifetime is invited and a drop in productivity is caused. For this reason, the rolling reduction is preferably 20% to 80%. More preferably, it is 25% to 70% or less.

Hot Rolled Annealing

Before supplying the hot rolled steel strip for cold rolling, it may be annealed. The purpose of the hot rolled annealing is to secure the productivity in the cold rolling by softening the steel strip before cold rolling and to obtain excellent fatigue characteristics and cold formability at the steel strip after cold rolled annealing by control of the structural ratios in the stage after hot rolled annealing. As the step of hot rolled annealing, either box annealing (BAF) or conventional continuous annealing (C-CAL) may be used.

The heating rate and cooling rate in box annealing are preferably 5° C./h to 80° C./h. With a heating rate of less than 5° C./h, the time required for the hot rolled annealing step increases and a drop in productivity is invited. On the other hand, if the heating rate exceeds 80° C./h, the temperature difference between the inner circumference side and outer circumference side of the steel strip taken up in a coil rises. Due to the rubbing of the steel strip caused by the difference in heat expansion, flaws are formed on the surface of the steel strip. These flaws lower the surface appearance of the product and in addition invite a drop in the fatigue characteristics. For this reason, the heating rate is preferably 5° C./h to 80° C./h. More preferably, it is 10° C./s to 60° C./s.

Preferably, the annealing temperature in box annealing is 450° C. to 720° C. and the holding time is 3 hours to 100 hours. With an annealing temperature of less than 450° C. or a holding time of less than 3 hours, the steel strip is not sufficiently softened and there is no effect on improvement of the productivity in the cold rolling. Further, if the annealing temperature exceeds 720° C., austenite is produced during the annealing and occurrence of flaws on the steel strip due to the change in heat expansion is caused. Furthermore, if the holding time exceeds 100 hours, the surface of the steel strip becomes adhesive and seizing occurs, so the surface appearance falls. For this reason, preferably the annealing temperature in box annealing is 450° C. to 720° C. and the holding time is 3 hours to 100 hours.

The heating rate and cooling rate in continuous annealing are preferably 5° C./s or more. With a heating rate of less than 5° C./s, a drop in the productivity is invited. On the other hand, there are no upper limits to the heating rate and cooling rate. The rates may be over 80° C./s as well. More preferably, they are 10° C./s or more.

Preferably, the annealing temperature in the continuous annealing is 650° C. to 900° C. and the holding time is 20 seconds to 300 seconds. With an annealing temperature of less than 650° C. or a holding time of less than 20 seconds, with the continuous annealing method, the steel strip is not sufficiently softened and there is no effect on improvement of the productivity in the cold rolling. Further, if the annealing temperature exceeds 900° C., the strength of the steel strip remarkably falls, sheet fracture in the furnace is invited, and a drop in the productivity is caused. Furthermore, if the holding time exceeds 300 seconds, impurities in the furnace deposit on the surface of the steel sheet and the surface appearance falls. For this reason, preferably the annealing temperature in continuous annealing is 650° C. to 900° C. and the holding time is 20 seconds to 300 seconds. More preferably, the annealing temperature is 680° C. to 850° C. and the holding time is 30 seconds to 240 seconds.

Cold Rolled Annealing

The purpose of the cold rolled annealing is the restoration of the cold formability of the steel strip lost due to cold rolling. Further, by optimizing the ratios of the structures of ferrite, pearlite, bainite, martensite, and residual austenite, excellent fatigue characteristics and cold formability are obtained. As the cold rolled annealing step, either the conventional continuous annealing method (C-CAL) or reheat type continuous annealing method (R-CAL) may be used.

The characterizing features in the method of production at the heating and holding and cooling stages of cold rolled annealing in the normal continuous annealing method are as described for the continuous annealing of the hot rolled annealing step.

Preferably, the temperature in the overaging zone in conventional continuous annealing is 300° C. to 500° C. and the holding time is 50 seconds to 500 seconds. In the overaging zone, the austenite formed at the stage of heating is transformed to bainite or martensite. By suitably controlling the amount and morphology of residual austenite, excellent fatigue characteristics and cold formability are obtained. With an aging temperature of less than 300° C. and a holding time of less than 50 seconds, the amount of transformation of bainite is insufficient. Further, with an aging temperature of 500° C. or more and a holding time of less than 500 seconds, the amount of residual austenite remarkably falls, so the fatigue characteristics and cold formability can no longer both be realized. For this reason, preferably the temperature in the overaging zone in conventional continuous annealing is 300° C. to 500° C. and the holding time is 50 seconds to 500 seconds. More preferably, the temperature is 450° C. or less and the holding time is 90 seconds to 300 seconds.

The heating rate and cooling rate in reheat type continuous annealing are preferably 5° C./s or more. With a heating rate of less than 5° C./s, a drop in the productivity is invited. On the other hand, there are no upper limits to the heating rate and cooling rate. The rates may be over 80° C./s as well. More preferably, they are 10° C./s or more.

Preferably, the annealing temperature in reheat type continuous annealing is 700° C. to 900° C. and the holding time is 20 seconds to 300 seconds. With an annealing temperature of less than 700° C. or a holding time of less than 20 seconds, the amount of austenite transforming during continuous annealing is not sufficient. In the subsequent quenching and partitioning, the desired structural ratio can no longer be controlled to. Further, if the annealing temperature exceeds 900° C., the strength of the steel strip remarkably falls, sheet fracture inside the furnace is invited, and a drop in the productivity is caused. Furthermore, if the holding time exceeds 300 seconds, impurities in the furnace deposit on the surface of the steel sheet and the surface appearance falls. For this reason, preferably the annealing temperature in the continuous annealing is 700° C. to 900° C. and the holding time is 20 seconds to 300 seconds. More preferably, the annealing temperature is 720° C. to 850° C. and the holding time is 30 seconds to 240 seconds.

Preferably the cooling stop temperature in reheat type continuous annealing is 100° C. to 340° C. and the holding time is 5 seconds to 60 seconds. In the process of this cooling, part of the austenite is made to transform to martensite and the strength of the steel material is made to increase. If the cooling stop temperature is less than 100° C., the amount of transformation of martensite becomes excessive and the ductility and cold formability of the steel material are impaired. For this reason, the lower limit of the cooling stop temperature is preferably 100° C. or more. If the cooling stop temperature exceeds 340° C. or the holding time is less than 5 seconds, only a small amount of martensite is obtained and it becomes difficult to make the strength of the steel increase. For this reason, preferably the upper limit of the cooling stop temperature is 340° C. or less and the lower limit of the holding time is 5 seconds or more. Further, even if holding for over 60 seconds, no great change occurs structurally, so the upper limit of the holding time is preferably 60 seconds. More preferably, the temperature is 150° C. to 320° C. and the holding time is 6 seconds to 50 seconds.

Preferably, the temperature in the overaging zone in reheat type continuous annealing is 350° C. to 480° C. and the holding time is 50 seconds to 500 seconds. In the overaging zone, part of the martensite formed at the time of stopping cooling acts as nuclei for promotion of transformation of the remaining austenite to bainite. By suitably controlling the amount and morphology of the residual austenite, excellent fatigue characteristics and cold formability are obtained. With an aging temperature of less than 350° C. and a holding time of less than 50° C., the amount of transformation of bainite is insufficient. Further, with an aging temperature of 480° C. or more and a holding time of less than 500 seconds, the amount of residual austenite remarkably falls, so both the fatigue characteristics and cold formability can no longer be realized. For this reason, preferably the temperature in the overaging zone in reheat type continuous annealing is 350° C. to 480° C. and the holding time is 50 seconds to 500 seconds. The more preferable temperature is 380° C. to 460° C. and the holding time is 60 seconds to 400 seconds.

Further, in the cold rolled annealing step, it is also possible to form a coating layer selected from the group comprised of zinc, aluminum, magnesium, and alloys of the same at the two sides of the steel sheet.

The morphology of the present invention cannot be obtained by the general carburizing, nitriding, soft nitriding, induction surface hardening, etc. of conventional surface layer reforming. The reason is that with carburizing, nitriding, soft nitriding, and other heat treatment techniques, excessive carbon and nitrogen penetrate the surface layer unevenly, the variation in hardness of the hard layer becomes greater, and the cold formability falls. Further, with the art of induction surface hardening etc., carbides remain at the center of sheet thickness and the volume rate of the carbides contained in the inner layer becomes larger, so the cold formability falls.

Even if using a steel material produced by the diffusion heat treatment method using blanks of the above thin steel sheets or a hot rolled steel strip or cold rolled annealed steel strip produced from a multi-layer slab as a material to produce a part by hot stamping or another hot forming method, the effect of the present invention is similarly obtained.

According to the above method of production, by forming on one or both surfaces of a steel sheet a hard layer with an average micro-Vickers hardness of 240 HV or more and less than 400 HV and furthermore controlling the amounts of C and N of the hard layer to suitable values, making the average micro-Vickers hardness of the inner layer 80 HV or more and less than 400 HV, controlling the volume rate of the carbides contained in the inner layer to less than 2.00%, and making the average micro-Vickers hardness of the hard layer 1.05 times or more the average micro-Vickers hardness of the inner layer, it is possible to obtain steel sheet achieving both fatigue characteristics and cold working at high levels.

EXAMPLES

Next, examples will be used to explain the effects of the present invention.

The levels of the examples are illustrations of the conditions employed for confirming the workability and effects of the present invention. The present invention is not limited to this illustration of conditions. The present invention is assumed to be able to employ various conditions so long as not departing from the gist of the present invention and achieving the object of the present invention.

Example 1

The top and bottom surfaces of thickness 2 mm hot rolled steel sheets having the constituents A to F shown in Table 1-1 were pickled. In steel sheets with hard layers bonded to the top and bottom layers, machining was used to finish the thickness of the top and bottom layers to 0.8 mm and the thickness of the inner layer to 0.4 mm then the bonding surfaces were polished by #180 polishing paper and ultrasonic cleaning was performed to remove the dirt. Further, in steel sheets with hard layers bonded to only the top layer, machining was used to finish the thickness of the top layer to 0.8 mm and the thickness of the inner layer to 1.2 mm then the above-mentioned polishing and washing were performed.

Next, the sheets were superposed in the combinations shown in Example Nos. 1 to 30 of Table 2, 0.2 MPa loads were applied, and the samples were inserted in a 1000° C. heating furnace and held there for 120 minutes, then taken out. The samples were cooled down to room temperature once, then the loads applied to the samples were removed, then the samples were inserted into a 900° C. heating furnace, held there for 20 minutes, then treated to cool them in various ways.

Example Nos. 1 to 6 were quenched in 60° C. oil, Nos. 7 to 12 were water cooled, and Nos. 13 to 24 were air cooled. Further, to clarify the difference from conventional treatment conditions, in Example Nos. 27 to 30, various heat treatment such as induction surface hardening, nitriding, carburizing (carbon potential: 0.37%), and shot peening were performed to produce comparative samples increased in surface hardness. Next, the procedures described previously were used to evaluate the hardness, structure, fatigue characteristics, and cold formability of the samples.

Table 2 shows the results of evaluation of the samples. In the table, "top" shows the hard layer of the top layer, "bottom" shows the hard layer of the bottom layer, "inner" shows the inner layer, Vcem shows the volume rate of the carbides, and TS shows the tensile strength (same below). Invention Example Nos. 5, 8, 12, 13, 15, 17 to 19, 21, 23, and 24 all had an average micro-Vickers hardness of the hard layer of 240 HV or more and less than 400 HV, an amount of C of the hard layer of less than 0.4% and an amount of N of less than 0.02%, an average Vickers hardness of the inner layer of 80 HV to 400 HV, a volume rate of carbides contained in the inner layer of less than 2%, a ratio of hardnesses of the hard layer and the inner layer of 1.05 or more, and excellent fatigue characteristics and cold workability.

As opposed to this, Comparative Example Nos. 1, 7, 16, and 22 had a hardness of the top layer of less than 240 HV, so the fatigue characteristics fell.

Nos. 2, 4, 9, and 10 had a hardness of the inner layer of over 400 HV, so the cold formability fell.

Nos. 1 to 4, 7, 9, 10, 14, 16, 20, and 22 were not suitable in ratio of hardness of the hard layer and the inner layer, so the fatigue characteristics fell.

With the induction surface hardening heat treatment of No. 27, the volume rate of carbides remaining at the inner layer exceeded 2%, so the cold formability fell. With the nitriding heat treatment of No. 28, the amount of N of the surface layer exceeded 0.02%, so the cold formability fell. With the carburizing heat treatment of No. 29, the content of C was high and the inner layer increasingly softened, so the cold formability fell. With the nitriding of No. 28, the carburizing heat treatment of No. 29, and the shot peening of No. 30, the variation in hardness was large, so the fatigue strength fell.

Example 2

Next, to investigate the effects of the thickness of the hard layer, using the combination of Invention Example No. 23 of Table 2 as the base, the thicknesses of the hard layer and the inner layer were controlled in advance by cold rolling to prepare thickness 2 mm Sample Nos. 31 to 47 with a ratio of thickness of the hard layer changed in accordance with the procedure described above.

Table 3 shows the results of evaluation of the samples. Invention Example Nos. 34 to 46 all had a thickness of the hard layer of 20 μm or more or 40% or less of the total sheet thickness and excellent fatigue characteristics and cold workability.

As opposed to this, Comparative Example Nos. 31 to 33 had a thickness of the hard layer of less than 20 μm, so the fatigue characteristics fell. Further, Comparative Example No. 47 had a thickness of the hard layer of over 40%, so the cold formability fell. To facilitate understanding, the relationship between the thickness of the hard layer and the fatigue limit ratio of the invention examples and comparative examples of Table 3 is shown in FIG. 1.

Example 3

Next, to investigate the effects of the constituents, thickness 1.2 mm samples having the compositions of D, E, and F of Table 1-1 were fixed as the inner layer and thickness 0.4 mm samples having the compositions of "j" to "aj" were combined as hard layers to investigate the effects of the constituents (Example Nos. 48 to 92). Further, samples having the compositions of "a", "b", and "c" of Table 1-2 were fixed as thickness 0.4 mm hard layers and thickness 1.2 mm samples having the compositions of G to AJ were combined as inner layers to evaluate the effects of the constituents (Example Nos. 93 to 141). In the production of the samples, the procedure described previously was followed to adjust the sheet thicknesses by grinding, polish and wash the samples, treat them by diffusion heat treatment, then insert the samples into a furnace heated to 900° C., hold them there for 20 minutes, then take them out, press them by sheet dies, and cool them in the dies until room temperature.

Tables 4-1 and 4-2 show the results of evaluation of the samples. Invention Example Nos. 49, 53, 55 to 57, 73 to 96, 98 to 102, 104 to 107, 109 to 113, 119, 132, 133, 137, and 138 all had an average micro-Vickers hardness of the hard layer of 240 HV or more and less than 400 HV, an amount of C of the hard layer of less than 0.4% and an amount of N of less than 0.02%, an average Vickers hardness of the inner layer of 80 HV to 400 HV, a volume rate of carbides contained in the inner layer of less than 2%, a ratio of hardnesses of the hard layer and the inner layer of 1.05 or more, and excellent fatigue characteristics and cold workability.

Example 4

Further, to investigate the effects of the manufacturing conditions of hot rolling, multilayer materials of ingots arranging "a", "b", "c", "d", "g", "j", "k", "l", "m", "n", "o", "p", "q", and "s" of Table 1-2 recognized as having excellent characteristics at the hard layer as the top and bottom layers and combining A, B, C, D, E, F, G, H, I, J, M, N, O, P, and Q of Table 1-1 recognized as having excellent characteristics at the inner layer as the inner layer were prepared, subjected to 0.1 MPa contact pressure, held in a furnace heated to 1000° C. for 120 minutes, and treated by diffusion heat treatment. Note that, the thickness ratio of the top and bottom layers in the multilayer materials of the ingots was adjusted to 40% and the thickness ratio of the inner layer was adjusted to 20%.

Next, thickness 2.4 mm samples were fabricated by the hot rolling conditions shown in Tables 5-1 and 5-2, pickled, then supplied to the various evaluation tests. The holding times in Tables 5-1 and 5-2 show the times when the heating temperature was 1100 to 1300° C. in range.

Tables 5-1 and 5-2 show the results of evaluation of the samples. Invention Example Nos. 142, 144, 146 to 150, 152 to 156, 158 to 161, 163 to 174, and 176 to 190 all had an average micro-Vickers hardness of the hard layer of 240 HV or more and less than 400 HV, an amount of C of the hard layer of less than 0.4% and an amount of N of less than 0.02%, an average Vickers hardness of the inner layer of 80 HV to 400 HV, a volume rate of carbides contained in the inner layer of less than 2%, a ratio of hardnesses of the hard layer and the inner layer of 1.05 or more, and excellent fatigue characteristics and cold workability.

As opposed to this, Comparative Example Nos. 151 and 162 had a long heating time of the hot rolling, so an oxide layer formed between the hard layer and the inner layer. In the fatigue test and the evaluation of the cold formability, interfacial peeling of the hard layer and the inner layer occurred. Comparative Example Nos. 157 and 175 were high in finish temperature of hot rolling, so thick scale formed at the steel strip surface and the surface roughness degree fell, so the fatigue characteristics fell. Comparative Example No. 143 was low in finish temperature of hot rolling, so the hard layer became harder and the ratio of hardness of the hard layer and the inner layer no longer was suitable. Comparative Example No. 145 was high in coiling temperature of hot rolling, so the hardness of the hard layer fell and a drop in hardness of the inner layer was invited.

Example 5

To investigate the effects of manufacturing conditions using "cold rolling-annealing", steels were treated by the "cold rolling-annealing" of Table 6 and supplied to various tests.

Table 6 shows the results of evaluation of the samples. Regardless of the conditions of "cold rolling-annealing", Invention Example Nos. 191 to 211 all had an average micro-Vickers hardness of the hard layer of 240 HV or more and less than 400 HV, an amount of C of the hard layer of less than 0.4% and an amount of N of less than 0.02%, an average Vickers hardness of the inner layer of 80 HV to 400 HV, a volume rate of carbides contained in the inner layer of less than 2%, a ratio of hardnesses of the hard layer and the inner layer of 1.05 or more, and excellent fatigue characteristics and cold workability.

TABLE 1-1

| | Inner layer constituents (mass %) | | | | | | | | | | | | | | |
|---|---|---|---|---|---|---|---|---|---|---|---|---|---|---|---|
| No | C | Si | Mn | P | S | Al | N | O | Cr | Mo | Ti | B | Nb | V | Cu |
| A | 0.08 | 0.22 | 2.5 | 0.006 | 0.0021 | 0.024 | 0.001 | 0.001 | — | — | — | 0.005 | — | — | — |
| B | 0.11 | 0.92 | 1.6 | 0.009 | 0.0073 | 0.288 | 0.003 | 0.011 | — | 0.04 | 0.03 | 0.009 | 0.05 | — | — |
| C | 0.22 | 0.18 | 1 | 0.01 | 0.0048 | 0.411 | 0.004 | 0.003 | — | 0.1 | 0.05 | — | — | — | — |
| D | 0.2 | 1.64 | 2.3 | 0.015 | 0.0099 | 0.006 | 0.004 | 0.001 | — | — | — | — | — | 0.04 | — |
| E | 0.05 | 0.1 | 1.5 | 0.002 | 0.0191 | 0.092 | 0.003 | 0.002 | — | — | 0.09 | 0.009 | — | — | — |
| F | 0.001 | 0.03 | 0.2 | 0.011 | 0.0039 | 0.039 | 0.001 | 0.001 | — | 0.05 | — | — | — | — | — |
| G | 0.005 | 0.8 | 1.5 | 0.019 | 0.017 | 0.003 | 0.004 | 0.009 | — | 0.2 | — | — | 0.2 | — | — |
| H | 0.015 | 0.3 | 0.5 | 0.0003 | 0.0004 | 0.18 | 0.012 | 0.015 | 0.5 | — | 0.2 | — | 0.05 | — | 0.1 |
| I | 0.03 | 1 | 0.2 | 0.007 | 0.0041 | 0.021 | 0.001 | 0.001 | — | — | — | — | 0.07 | 0.09 | 0.34 |
| J | 0.07 | 0.5 | 2 | 0.016 | 0.0128 | 0.018 | 0.006 | 0.001 | — | 0.08 | 0.12 | — | — | — | 0.22 |
| K | 0.1 | 1.5 | 2.2 | 0.012 | 0.0038 | 0.396 | 0.011 | 0.004 | 1 | 0.3 | 0.02 | — | — | 0.21 | — |
| L | 0.12 | 0.1 | 1.5 | 0.003 | 0.0152 | 0.197 | 0.005 | 0.002 | — | 0.4 | — | — | 0.48 | — | — |
| M | 0.13 | 1.5 | 1.7 | 0.019 | 0.0112 | 0.096 | 0.009 | 0.005 | — | — | 0.05 | — | — | — | 0.45 |
| N | 0.15 | 0.3 | 1 | 0.015 | 0.0184 | 0.047 | 0.017 | 0.001 | 0.3 | — | 0.14 | 0.007 | 0.04 | — | 0.2 |
| O | 0.17 | 0.1 | 1.3 | 0.006 | 0.01 | 0.037 | 0.006 | 0.001 | — | — | 0.05 | — | — | — | — |
| P | 0.23 | 0.4 | 1.5 | 0.001 | 0.0024 | 0.281 | 0.001 | 0.007 | 1 | 0.1 | — | 0.006 | 0.05 | — | 0.43 |
| Q | 0.24 | 1.8 | 1.6 | 0.004 | 0.0083 | 0.086 | 0.005 | 0.02 | — | — | 0.1 | 0.004 | 0.05 | — | — |
| R | 0.25 | 2 | 4.2 | 0.014 | 0.0124 | 0.015 | 0.013 | 0.001 | 0.3 | — | 0.4 | — | — | 0.08 | 0.31 |
| S | 0.26 | 0.6 | 1.5 | 0.016 | 0.0057 | 0.027 | 0.003 | 0.004 | — | — | 0.03 | 0.009 | — | 0.34 | — |
| U | 0.36 | 0.1 | 0.8 | 0.007 | 0.0008 | 0.478 | 0.006 | 0.004 | — | — | — | — | — | — | — |
| W | 0 | 0.94 | 2 | 0.014 | 0.0083 | 0.075 | 0.007 | 0.002 | — | — | — | — | — | — | — |
| X | 0.19 | 3.08 | 1.39 | 0.01 | 0.0005 | 0.03 | 0.005 | 0.002 | 0.4 | 0.08 | — | — | — | — | — |
| Y | 0.16 | 0.81 | 0.17 | 0.006 | 0.0056 | 0.029 | 0.009 | 0.003 | 0.1 | — | — | — | — | — | — |
| Z | 0.18 | 1.43 | 1.2 | 0.021 | 0.0092 | 0.071 | 0.008 | 0.004 | 0.4 | — | 0.04 | — | — | — | — |
| AA | 0.11 | 2.94 | 1.2 | 0.01 | 0.0211 | 0.014 | 0.005 | 0.001 | 0.4 | 0.05 | — | — | — | — | — |
| AB | 0.19 | 1.45 | 1.4 | 0.004 | 0.0038 | 0.509 | 0.006 | 0.004 | — | — | — | — | — | — | — |
| AC | 0.12 | 2.82 | 1.4 | 0.01 | 0.0027 | 0.064 | 0.021 | 0 | — | — | — | — | — | — | — |
| AD | 0.19 | 0.75 | 1.4 | 0.001 | 0.0078 | 0.031 | 0.002 | 0.002 | 2.1 | — | — | — | — | — | — |
| AE | 0.18 | 1.44 | 1.2 | 0.012 | 0.0022 | 0.058 | 0.005 | 0.003 | — | 1.05 | — | — | — | — | — |
| AF | 0.09 | 1.21 | 1.2 | 0.007 | 0.0089 | 0.028 | 0.014 | 0.022 | 0.3 | 0.05 | 0 | — | — | — | — |

TABLE 1-1-continued

| | | | | | | | | | | | | | | |
|---|---|---|---|---|---|---|---|---|---|---|---|---|---|---|
| AG | 0.1 | 1.33 | 1.2 | 0.008 | 0.0011 | 0.005 | 0.001 | 0.002 | — | — | 0.52 | — | — | — |
| AH | 0.1 | 0.71 | 1.2 | 0.007 | 0.0009 | 0.02 | 0.007 | 0.004 | — | — | — | 0.011 | — | — |
| AI | 0.19 | 2.54 | 1.2 | 0.0002 | 0.0033 | 0.016 | 0.008 | 0.004 | — | — | — | — | 0.52 | — |
| AJ | 0.15 | 0.29 | 1.2 | 0.003 | 0.0016 | 0.032 | 0.013 | 0.003 | — | — | — | — | — | 0.51 |

| | Inner layer constituents (mass %) | | | | | | | | | | | |
|---|---|---|---|---|---|---|---|---|---|---|---|---|
| No | W | Ta | Ni | Sn | Sb | As | Mg | Ca | Y | Zr | La | Ce | Remarks |
| A | — | — | — | — | — | — | — | — | — | — | — | — | Within scope |
| B | — | — | — | — | — | — | — | — | — | — | — | — | |
| C | — | — | — | — | — | — | 0.01 | 0.007 | — | — | — | 0.049 | |
| D | — | — | — | — | — | — | — | — | — | — | — | — | |
| E | — | — | — | — | — | — | — | — | — | — | — | — | |
| F | — | — | — | — | — | — | — | — | — | — | — | — | |
| G | — | 0.06 | — | — | 0.05 | — | 0.004 | 0.008 | 0.03 | 0.01 | — | 0.048 | |
| H | — | — | 0.11 | — | — | 0.03 | — | 0.044 | — | — | 0.006 | — | |
| I | — | 0.09 | 0.1 | — | — | 0.04 | — | — | — | — | — | 0.016 | |
| J | — | — | 0.25 | — | — | — | — | — | — | — | — | — | |
| K | 0.1 | — | — | — | — | — | — | 0.006 | 0.03 | 0.01 | — | 0.031 | |
| L | — | 0.07 | — | — | — | — | 0.007 | 0.01 | — | — | — | — | |
| M | — | — | 0.1 | — | 0.05 | — | — | — | — | — | — | — | |
| N | — | — | 0.18 | — | — | — | — | — | — | — | — | — | |
| O | 0.09 | — | — | — | — | — | — | — | — | — | — | — | |
| P | — | — | 0.45 | 0.05 | — | — | — | — | — | — | — | — | |
| Q | — | — | — | — | 0.05 | 0.01 | — | — | 0.04 | 0.01 | 0.03 | — | |
| R | 0.05 | — | 0.28 | — | — | — | — | — | — | 0.03 | — | — | Outside scope |
| S | — | — | — | — | — | — | — | — | — | — | — | — | Within scope |
| U | — | — | — | — | — | — | — | — | — | — | — | — | Outside scope |
| W | — | — | — | — | — | — | — | — | — | — | — | — | |
| X | — | — | — | — | — | — | — | — | — | — | — | — | |
| Y | — | — | — | — | — | — | — | — | — | — | — | — | Within scope |
| Z | — | — | 0.19 | — | — | — | — | — | — | — | — | — | Outside scope |
| AA | — | — | 0.16 | — | — | — | — | — | — | — | — | — | |
| AB | — | — | — | — | — | — | — | — | — | — | — | — | |
| AC | — | — | 0.14 | — | — | — | — | — | — | — | — | — | |
| AD | — | — | 0.09 | — | — | — | — | — | — | — | — | — | |
| AE | — | — | 0.2 | — | — | — | — | — | — | — | — | — | |
| AF | — | — | — | — | — | — | — | — | — | — | — | — | |
| AG | — | — | — | — | — | — | — | — | — | — | — | — | |
| AH | — | — | 0.09 | — | — | — | — | — | — | — | — | — | |
| AI | — | — | — | — | — | — | — | — | — | — | — | — | |
| AJ | — | — | — | — | — | — | — | — | — | — | — | — | |

TABLE 1-2

| | Hard layer constituents (mass %) | | | | | | | | | | | | | | |
|---|---|---|---|---|---|---|---|---|---|---|---|---|---|---|---|
| No | C | Si | Mn | P | S | Al | N | O | Cr | Mo | Ti | B | Nb | V | Cu |
| a | 0.08 | 0.22 | 2.5 | 0.006 | 0.0021 | 0.024 | 0.001 | 0.001 | — | — | — | 0.005 | — | — | — |
| b | 0.11 | 0.92 | 1.6 | 0.009 | 0.0073 | 0.288 | 0.003 | 0.011 | — | 0.04 | 0.03 | 0.009 | 0.05 | — | — |
| c | 0.22 | 0.18 | 1 | 0.01 | 0.0048 | 0.411 | 0.004 | 0.003 | — | 0.1 | 0.05 | — | — | — | — |
| d | 0.2 | 1.64 | 2.3 | 0.015 | 0.0099 | 0.006 | 0.004 | 0.001 | — | — | — | — | — | 0.04 | — |
| e | 0.05 | 0.1 | 1.5 | 0.011 | 0.0191 | 0.092 | 0.003 | 0.002 | — | — | 0.09 | 0.009 | — | — | — |
| f | 0.001 | 0.03 | 0.2 | 0.011 | 0.0039 | 0.039 | 0.001 | 0.001 | — | 0.05 | — | — | — | — | — |
| j | 0.07 | 0.5 | 2 | 0.016 | 0.0128 | 0.018 | 0.006 | 0.001 | — | 0.08 | 0.12 | — | — | — | 0.22 |
| k | 0.1 | 1.5 | 2.2 | 0.012 | 0.0038 | 0.396 | 0.011 | 0.004 | 1 | 0.3 | 0.02 | — | — | 0.21 | — |
| l | 0.12 | 0.1 | 1.5 | 0.003 | 0.0152 | 0.197 | 0.005 | 0.002 | — | 0.4 | — | — | 0.48 | — | — |
| m | 0.13 | 1.5 | 1.7 | 0.019 | 0.0112 | 0.096 | 0.009 | 0.005 | — | — | 0.05 | — | — | — | 0.45 |
| n | 0.15 | 0.3 | 1 | 0.015 | 0.0184 | 0.047 | 0.017 | 0.001 | 0.3 | — | 0.14 | 0.007 | 0.04 | — | 0.2 |
| o | 0.17 | 0.1 | 1.3 | 0.006 | 0.01 | 0.037 | 0.006 | 0.001 | — | — | 0.05 | — | — | — | — |
| p | 0.23 | 0.4 | 1.5 | 0.001 | 0.0024 | 0.281 | 0.001 | 0.007 | 1 | 0.1 | — | 0.006 | 0.05 | — | 0.43 |
| q | 0.24 | 1.8 | 1.6 | 0.004 | 0.0083 | 0.086 | 0.005 | 0.02 | — | — | 0.1 | 0.004 | 0.05 | — | — |
| r | 0.25 | 2 | 4.2 | 0.014 | 0.0124 | 0.015 | 0.013 | 0.001 | 0.3 | — | 0.4 | — | — | 0.08 | 0.31 |
| s | 0.26 | 0.6 | 1.5 | 0.016 | 0.0057 | 0.027 | 0.003 | 0.001 | — | — | 0.03 | 0.009 | — | 0.34 | — |
| t | 0.04 | 2.24 | 9.82 | 0.005 | 0.0195 | 0.071 | 0.002 | 0.001 | — | — | — | — | — | — | — |
| u | 0.36 | 0.1 | 0.8 | 0.007 | 0.0008 | 0.478 | 0.006 | 0.004 | — | — | — | — | — | — | — |
| v | 0.08 | 0.1 | 10.15 | 0.014 | 0.0085 | 0.004 | 0.013 | 0.004 | — | — | — | — | — | — | — |
| x | 0.19 | 3.08 | 1.39 | 0.01 | 0.0005 | 0.03 | 0.005 | 0.002 | 0.4 | 0.08 | — | — | — | — | — |
| y | 0.16 | 0.81 | 0.17 | 0.006 | 0.0056 | 0.029 | 0.009 | 0.003 | 0.1 | — | — | — | — | — | — |
| z | 0.18 | 1.43 | 1.2 | 0.021 | 0.0092 | 0.071 | 0.008 | 0.004 | 0.4 | — | 0.04 | — | — | — | — |
| aa | 0.11 | 2.94 | 1.2 | 0.01 | 0.0211 | 0.014 | 0.005 | 0.001 | 0.4 | 0.05 | — | — | — | — | — |
| ab | 0.19 | 1.45 | 1.4 | 0.004 | 0.0038 | 0.509 | 0.006 | 0.004 | — | — | — | — | — | — | — |

TABLE 1-2-continued

| | | | | | | | | | | | | | |
|---|---|---|---|---|---|---|---|---|---|---|---|---|---|
| ac | 0.12 | 2.82 | 1.4 | 0.01 | 0.0027 | 0.064 | <u>0.021</u> | 0 | — | — | — | — | — |
| ad | 0.19 | 0.75 | 1.4 | 0.001 | 0.0078 | 0.031 | 0.002 | 0.002 | <u>2.1</u> | — | — | — | — |
| ae | 0.18 | 1.44 | 1.2 | 0.012 | 0.0022 | 0.058 | 0.005 | 0.003 | — | <u>1.05</u> | — | — | — |
| af | 0.09 | 1.21 | 1.2 | 0.007 | 0.0089 | 0.028 | 0.014 | <u>0.022</u> | 0.3 | 0.05 | — | — | — |
| ag | 0.1 | 1.33 | 1.2 | 0.008 | 0.0011 | 0.005 | 0.001 | 0.002 | — | — | <u>0.52</u> | — | — |
| ah | 0.1 | 0.71 | 1.2 | 0.007 | 0.0009 | 0.02 | 0.007 | 0.004 | — | — | — | <u>0.011</u> | — |
| ai | 0.19 | 2.54 | 1.2 | 0.0002 | 0.0033 | 0.016 | 0.008 | 0.004 | — | — | — | — | <u>0.518</u> |
| aj | 0.15 | 0.29 | 1.2 | 0.003 | 0.0016 | 0.032 | 0.013 | 0.003 | — | — | — | — | — |

| | | | | | | Hard layer constituents (mass %) | | | | | | | |
|---|---|---|---|---|---|---|---|---|---|---|---|---|---|
| No | W | Ta | Ni | Sn | Sb | As | Mg | Ca | Y | Zr | La | Ce | Remarks |
| a | — | — | — | — | — | — | — | — | — | — | — | — | Within scope |
| b | — | — | — | — | — | — | — | — | — | — | — | — | |
| c | — | — | — | — | — | — | 0.01 | 0.007 | — | — | — | 0.049 | |
| d | — | — | — | — | — | — | — | — | — | — | — | — | |
| e | — | — | — | — | — | — | — | — | — | — | — | — | |
| f | — | — | — | — | — | — | — | — | — | — | — | — | Outside scope |
| j | — | — | 0.25 | — | — | — | — | — | — | — | — | — | Within scope |
| k | 0.1 | — | — | — | — | — | — | 0.006 | 0.031 | 0.006 | — | 0.031 | |
| l | — | 0.07 | — | — | — | — | 0.004 | 0.01 | — | — | — | — | |
| m | — | — | 0.1 | — | 0.046 | — | — | — | — | — | — | — | |
| n | — | — | 0.18 | — | — | — | — | — | — | — | — | — | |
| o | 0.09 | — | — | — | — | — | — | — | — | — | — | — | |
| p | — | — | 0.45 | 0.05 | — | — | — | — | — | — | — | — | |
| q | — | — | — | — | 0.047 | 0.01 | — | — | 0.035 | 0.006 | 0.03 | — | |
| r | 0.05 | — | 0.28 | — | — | — | — | 0.02 | — | 0.03 | — | — | |
| s | — | — | — | — | — | — | — | — | — | — | — | — | |
| t | — | — | — | — | — | — | — | — | — | — | — | — | |
| u | — | — | — | — | — | — | — | — | — | — | — | — | Outside scope |
| v | — | — | — | — | — | — | — | — | — | — | — | — | |
| x | — | — | — | — | — | — | — | — | — | — | — | — | |
| y | — | — | — | — | — | — | — | — | — | — | — | — | |
| z | — | — | 0.19 | — | — | — | — | — | — | — | — | — | |
| aa | — | — | 0.16 | — | — | — | — | — | — | — | — | — | |
| ab | — | — | — | — | — | — | — | — | — | — | — | — | |
| ac | — | — | 0.14 | — | — | — | — | — | — | — | — | — | |
| ad | — | — | 0.09 | — | — | — | — | — | — | — | — | — | |
| ae | — | — | 0.2 | — | — | — | — | — | — | — | — | — | |
| af | — | — | — | — | — | — | — | — | — | — | — | — | |
| ag | — | — | — | — | — | — | — | — | — | — | — | — | |
| ah | — | — | 0.09 | — | — | — | — | — | — | — | — | — | |
| ai | — | — | — | — | — | — | — | — | — | — | — | — | |
| aj | — | — | — | — | — | — | — | — | — | — | — | — | |

TABLE 2

| No | Heat treatment | Layer configuration | | | Top | | Bottom | | Vickers hardness | | |
|---|---|---|---|---|---|---|---|---|---|---|---|
| | | Top | Inner | Bottom | C conc. | N conc. | C conc. | N conc. | Top | Inner | Bottom |
| 1 | Oil cooling | f | A | c | 0.001 | 0.0013 | 0.22 | 0.0044 | <u>144</u> | 357 | 385 |
| 2 | | d | B | f | 0.2 | 0.0036 | 0.001 | 0.0013 | <u>444</u> | 409 | <u>135</u> |
| 3 | | e | C | a | 0.048 | 0.0029 | 0.08 | 0.0006 | 326 | 383 | 355 |
| 4 | | a | D | e | 0.08 | 0.0006 | 0.048 | 0.0029 | 360 | <u>441</u> | 333 |
| 5 | | c | E | b | 0.22 | 0.0044 | 0.11 | 0.0032 | 383 | 329 | 399 |
| 6 | | b | F | d | 0.11 | 0.0032 | 0.2 | 0.0036 | 398 | 256 | <u>444</u> |
| 7 | Water cooling | f | A | f | 0.001 | 0.0013 | 0.001 | 0.0013 | <u>134</u> | 384 | <u>133</u> |
| 8 | | a | E | a | 0.08 | 0.0006 | 0.08 | 0.0006 | 380 | 349 | 380 |
| 9 | | d | C | d | 0.2 | 0.0036 | 0.2 | 0.0036 | <u>477</u> | <u>492</u> | <u>473</u> |
| 10 | | e | D | e | 0.048 | 0.0029 | 0.048 | 0.0029 | 359 | <u>476</u> | 359 |
| 11 | | c | B | c | 0.22 | 0.0044 | 0.22 | 0.0044 | <u>499</u> | 399 | <u>499</u> |
| 12 | | b | F | b | 0.11 | 0.0032 | 0.11 | 0.0032 | 395 | 330 | 395 |
| 13 | Air cooling | c | A | — | 0.22 | 0.0044 | — | — | 310 | 278 | — |
| 14 | | e | B | — | 0.048 | 0.0029 | — | — | 262 | 317 | — |
| 15 | | b | C | — | 0.2 | 0.0036 | — | — | 322 | 291 | — |
| 16 | | f | D | — | 0.001 | 0.0013 | — | — | <u>130</u> | 325 | — |
| 17 | | a | E | — | 0.08 | 0.0006 | — | — | 288 | 259 | — |
| 18 | | d | F | — | 0.2 | 0.0036 | — | — | 330 | 200 | — |
| 19 | | c | A | c | 0.22 | 0.0044 | 0.22 | 0.0044 | 311 | 277 | 311 |
| 20 | | e | B | e | 0.048 | 0.0029 | 0.048 | 0.0029 | 266 | 316 | 266 |
| 21 | | b | C | b | 0.2 | 0.0036 | 0.2 | 0.0036 | 322 | 288 | 322 |
| 22 | | f | D | f | 0.001 | 0.0013 | 0.001 | 0.0013 | <u>130</u> | 330 | <u>130</u> |
| 23 | | a | E | a | 0.08 | 0.0006 | 0.08 | 0.0006 | 289 | 250 | 289 |
| 24 | | d | F | d | 0.2 | 0.0036 | 0.2 | 0.0036 | 333 | 210 | 333 |

TABLE 2-continued

| No | | | | | | | | | | | |
|---|---|---|---|---|---|---|---|---|---|---|---|
| 27 | Special | Induction | C | Induction | 0.22 | 0.0044 | 0.22 | 0.0044 | 384 | 286 | 391 |
| 28 | | Nitriding | F | Nitriding | 0.001 | 0.03 | 0.001 | 0.03 | 633 | 133 | 633 |
| 29 | | Carburizing. | F | Carburizing | 0.5 | 0.0013 | 0.5 | 0.0013 | 650 | 130 | 653 |
| 30 | | Shot | B | Shot | 0.11 | 0.0032 | 0.11 | 0.0032 | 380 | 285 | 380 |

| | Hardness ratio | | Standard deviation | | Vcem | TS | Fatigue limit | Roll forming: Cracking after cross-section | | | |
|---|---|---|---|---|---|---|---|---|---|---|---|
| No | Top | Bottom | Top | Bottom | Inner | MPa | ratio | Top | Inner | Bottom | Remarks |
| 1 | 0.4 | 1.08 | 1.5 | 1.6 | 0.81 | 812 | 0.35 | Good | Good | Good | Comp. ex. |
| 2 | 1.09 | 0.33 | 1.4 | 1.3 | 0.95 | 882 | 0.24 | Poor | Poor | Good | Comp. ex. |
| 3 | 0.85 | 0.93 | 1.6 | 1.5 | 1.33 | 965 | 0.44 | Good | Good | Good | Comp. ex. |
| 4 | 0.82 | 0.76 | 1.3 | 1.4 | 1.28 | 1003 | 0.38 | Good | Poor | Good | Comp. ex. |
| 5 | 1.16 | 1.21 | 1.5 | 1.6 | 0.28 | 1033 | 0.55 | Good | Good | Good | Inv. ex. |
| 6 | 1.55 | 1.73 | 1.4 | 1.3 | 0.01 | 1055 | 0.43 | Good | Good | Poor | Comp. ex. |
| 7 | 0.35 | 0.35 | 1.6 | 1 | 0.79 | 581 | 0.2 | Good | Good | Good | Comp. ex. |
| 8 | 1.09 | 1.09 | 1.3 | 1.8 | 0.97 | 1022 | 0.52 | Good | Good | Good | Inv. ex. |
| 9 | 0.97 | 0.96 | 1 | 1.4 | 1.29 | 1265 | 0.31 | Poor | Poor | Poor | Comp. ex. |
| 10 | 0.75 | 0.75 | 1.8 | 1.5 | 1.24 | 1042 | 0.36 | Good | Poor | Good | Comp. ex. |
| 11 | 1.25 | 1.25 | 1.4 | 1.4 | 0.25 | 1266 | 0.36 | Poor | Good | Poor | Comp. ex. |
| 12 | 1.2 | 1.2 | 1.5 | 1.6 | 0.01 | 1041 | 0.55 | Good | Good | Good | Inv. ex. |
| 13 | 1.12 | — | 1.4 | — | 0.8 | 849 | 0.49 | Good | Good | — | Inv. ex. |
| 14 | 0.83 | — | 1.6 | — | 0.95 | 805 | 0.39 | Good | Good | — | Comp. ex. |
| 15 | 1.11 | — | 1.3 | — | 1.35 | 878 | 0.49 | Good | Good | — | Inv. ex. |
| 16 | 0.4 | — | 1.5 | — | 1.35 | 607 | 0.4 | Good | Good | — | Comp. ex. |
| 17 | 1.11 | — | 1.4 | — | 0.3 | 801 | 0.49 | Good | Good | — | Inv. ex. |
| 18 | 1.65 | — | 1.6 | — | 0.01 | 820 | 0.49 | Good | Good | — | Inv. ex. |
| 19 | 1.12 | 1.12 | 1.3 | 1.3 | 0.8 | 850 | 0.56 | Good | Good | Good | Inv. ex. |
| 20 | 0.84 | 0.84 | 1 | 1 | 0.96 | 811 | 0.38 | Good | Good | Good | Comp. ex. |
| 21 | 1.12 | 1.12 | 1.8 | 1.8 | 1.37 | 876 | 0.55 | Good | Good | Good | Inv. ex. |
| 22 | 0.39 | 0.39 | 1.6 | 1.6 | 1.4 | 611 | 0.2 | Good | Good | Good | Comp. ex. |
| 23 | 1.16 | 1.16 | 1.3 | 1.3 | 0.32 | 795 | 0.57 | Good | Good | Good | Inv. ex. |
| 24 | 1.59 | 1.59 | 1 | 1 | 0.01 | 832 | 0.75 | Good | Good | Good | Inv. ex. |
| 27 | 1.34 | 1.37 | 1.7 | 1.7 | 2.15 | 1001 | 0.54 | Good | Poor | Good | Comp. ex. |
| 28 | 4.76 | 4.76 | 7 | 7.3 | 0.01 | 1392 | 0.43 | Poor | Good | Poor | Comp. ex. |
| 29 | 5 | 5.02 | 4 | 3.8 | 0.02 | 1425 | 0.43 | Poor | Good | Poor | Comp. ex. |
| 30 | 1.33 | 1.33 | 4.3 | 3.9 | 0.58 | 993 | 0.38 | Poor | Good | Poor | Comp. ex. |

TABLE 3

| Ex. | Layer thickness (μm) | | Layer thickness Ratio (%) | Vickers hardness | | | Standard deviation | | Vcem | TS MPa | Fatigue limit ratio | Roll forming: Cracking after cross-section | | | |
|---|---|---|---|---|---|---|---|---|---|---|---|---|---|---|---|
| No | Top | Bottom | | Top | Inner | Bottom | Top | Bottom | Inner | | | Top | Inner | Bottom | Remarks |
| 31 | 5 | 5 | 0.3 | 290 | 248 | 289 | 1.3 | 1.4 | 0.05 | 731 | 0.41 | Good | Good | Good | Comp. ex. |
| 32 | 10 | 10 | 0.5 | 289 | 248 | 288 | 1.2 | 1.2 | 0.05 | 731 | 0.44 | Good | Good | Good | Comp. ex. |
| 33 | 15 | 15 | 0.8 | 289 | 250 | 288 | 1.4 | 1.3 | 0.049 | 736 | 0.44 | Good | Good | Good | Comp. ex. |
| 34 | 21 | 21 | 1.1 | 288 | 251 | 292 | 1.2 | 1 | 0.05 | 739 | 0.6 | Good | Good | Good | Inv. ex. |
| 35 | 40 | 40 | 2 | 288 | 252 | 292 | 1.3 | 1.4 | 0.05 | 743 | 0.66 | Good | Good | Good | Inv. ex. |
| 36 | 60 | 60 | 3 | 292 | 251 | 289 | 1.3 | 1.2 | 0.05 | 743 | 0.72 | Good | Good | Good | Inv. ex. |
| 37 | 100 | 100 | 5 | 292 | 250 | 293 | 1.4 | 1.3 | 0.048 | 745 | 0.73 | Good | Good | Good | Inv. ex. |
| 38 | 150 | 150 | 7.5 | 289 | 253 | 289 | 1.3 | 1.4 | 0.05 | 754 | 0.67 | Good | Good | Good | Inv. ex. |
| 39 | 200 | 200 | 10 | 293 | 247 | 290 | 1.2 | 1.1 | 0.05 | 749 | 0.71 | Good | Good | Good | Inv. ex. |
| 40 | 250 | 250 | 13 | 289 | 250 | 290 | 1.3 | 1.4 | 0.051 | 758 | 0.67 | Good | Good | Good | Inv. ex. |
| 41 | 300 | 300 | 15 | 290 | 251 | 289 | 1.3 | 1.4 | 0.05 | 764 | 0.65 | Good | Good | Good | Inv. ex. |
| 42 | 350 | 350 | 18 | 290 | 251 | 287 | 1.1 | 1.3 | 0.051 | 768 | 0.62 | Good | Good | Good | Inv. ex. |
| 43 | 400 | 400 | 20 | 289 | 252 | 289 | 1.4 | 1.3 | 0.05 | 774 | 0.61 | Good | Good | Good | Inv. ex. |
| 44 | 500 | 500 | 25 | 287 | 252 | 289 | 1.1 | 1 | 0.05 | 781 | 0.58 | Good | Good | Good | Inv. ex. |
| 45 | 700 | 700 | 35 | 289 | 250 | 289 | 1.3 | 1.3 | 0.052 | 798 | 0.54 | Good | Good | Good | Inv. ex. |
| 46 | 800 | 800 | 40 | 289 | 250 | 290 | 1.3 | 1.3 | 0.05 | 808 | 0.51 | Good | Good | Good | Inv. ex. |
| 47 | 900 | 900 | 45 | 289 | 250 | 290 | 1.3 | 1.5 | 0.048 | 817 | 0.39 | Good | Good | Good | Comp. ex. |

TABLE 4-1

| | Layer configuration | | | Vickers hardness | | | Hardness ratio | | Standard deviation | | Vcem | TS | Fatigue limit | Roll forming: Cracking after cross-section | | | |
|---|---|---|---|---|---|---|---|---|---|---|---|---|---|---|---|---|---|
| No | Top | Inner | Bottom | Top | Inner | Bottom | Top | Bottom | Top | Bottom | Inner | MPa | ratio | Top | Inner | Bottom | Remarks |
| 48 | j | D | j | 305 | 324 | 305 | 0.94 | 0.94 | 1.5 | 1.6 | 1.29 | 889 | 0.43 | Good | Good | Good | Comp. st. |
| 49 | l | D | l | 395 | 324 | 396 | 1.22 | 1.22 | 1.6 | 1.5 | 1.31 | 973 | 0.66 | Good | Good | Good | Inv. st. |
| 50 | m | D | m | 300 | 325 | 301 | 0.92 | 0.93 | 1.3 | 1.4 | 1.29 | 886 | 0.41 | Good | Good | Good | Comp. st. |
| 51 | n | D | n | 288 | 325 | 288 | 0.89 | 0.89 | 1.5 | 1.6 | 1.29 | 875 | 0.38 | Good | Good | Good | Comp. st. |
| 52 | o | D | o | 270 | 324 | 271 | 0.83 | 0.84 | 1.4 | 1.3 | 1.3 | 857 | 0.33 | Good | Good | Good | Comp. st. |
| 53 | p | D | p | 345 | 324 | 346 | 1.06 | 1.07 | 1.2 | 1 | 1.3 | 927 | 0.54 | Good | Good | Good | Inv. st. |
| 54 | q | D | q | 310 | 323 | 309 | 0.96 | 0.96 | 1.3 | 1.4 | 1.3 | 892 | 0.44 | Good | Good | Good | Comp. st. |
| 55 | r | D | r | 366 | 323 | 361 | 1.13 | 1.12 | 1.3 | 1.2 | 1.3 | 942 | 0.58 | Good | Good | Good | Inv. st. |
| 56 | s | D | s | 360 | 324 | 358 | 1.11 | 1.1 | 1.4 | 1.3 | 1.29 | 939 | 0.57 | Good | Good | Good | Inv. st. |
| 57 | t | D | t | 399 | 324 | 395 | 1.23 | 1.22 | 1.3 | 1.4 | 1.31 | 974 | 0.66 | Good | Good | Good | Inv. st. |
| 58 | u | D | u | 433 | 324 | 432 | 1.34 | 1.33 | 1.2 | 1.1 | 1.31 | 1007 | 0.44 | Poor | Good | Poor | Comp. st. |
| 59 | v | D | v | 425 | 322 | 422 | 1.32 | 1.31 | 1.3 | 1.4 | 1.31 | 996 | 0.43 | Poor | Good | Poor | Comp. st. |
| 60 | x | D | x | 411 | 324 | 408 | 1.27 | 1.26 | 1.3 | 1.4 | 1.29 | 986 | 0.44 | Poor | Good | Poor | Comp. st. |
| 61 | y | D | y | 205 | 324 | 192 | 0.63 | 0.59 | 1.1 | 1.3 | 1.33 | 790 | 0.09 | Good | Good | Good | Comp. st. |
| 62 | z | D | z | 411 | 326 | 409 | 1.26 | 1.25 | 1.4 | 1.3 | 1.29 | 989 | 0.69 | Poor | Good | Poor | Comp. st. |
| 63 | aa | D | aa | 345 | 324 | 340 | 1.06 | 1.05 | 2.8 | 2.8 | 1.29 | 924 | 0.38 | Good | Good | Good | Comp. st. |
| 64 | ab | D | ab | 355 | 324 | 340 | 1.1 | 1.05 | 2.5 | 3 | 1.29 | 928 | 0.34 | Good | Good | Good | Comp. st. |
| 65 | ac | D | ac | 322 | 325 | 355 | 0.99 | 1.09 | 3.5 | 3 | 1.26 | 922 | 0.31 | Good | Good | Good | Comp. st. |
| 66 | ad | D | ad | 430 | 325 | 427 | 1.32 | 1.31 | 1.4 | 1.3 | 1.29 | 1005 | 0.43 | Poor | Good | Poor | Comp. st |
| 67 | ae | D | ae | 410 | 324 | 407 | 1.27 | 1.26 | 1.3 | 1.4 | 1.29 | 985 | 0.44 | Poor | Good | Poor | Comp. st. |
| 68 | af | D | af | 330 | 324 | 360 | 1.02 | 1.11 | 3.3 | 3.6 | 1.29 | 926 | 0.33 | Good | Good | Good | Comp. st. |
| 69 | ag | D | ag | 404 | 324 | 405 | 1.25 | 1.25 | 3 | 3.1 | 1.28 | 981 | 0.43 | Poor | Good | Poor | Comp. st. |
| 70 | ah | D | ah | 425 | 323 | 422 | 1.32 | 1.31 | 1.3 | 1.4 | 1.28 | 998 | 0.42 | Poor | Good | Poor | Comp. st. |
| 71 | ai | D | ai | 411 | 323 | 413 | 1.27 | 1.28 | 1.1 | 1.3 | 1.28 | 987 | 0.43 | Poor | Good | Poor | Comp. st. |
| 72 | aj | D | aj | 409 | 322 | 411 | 1.27 | 1.28 | 1.5 | 1.6 | 1.29 | 984 | 0.44 | Poor | Good | Poor | Comp. st. |
| 73 | j | E | j | 305 | 260 | 305 | 1.17 | 1.17 | 1.4 | 1.3 | 0.29 | 800 | 0.62 | Good | Good | Good | Inv. st. |
| 74 | l | E | l | 395 | 261 | 396 | 1.51 | 1.52 | 1.2 | 1 | 0.28 | 885 | 0.85 | Good | Good | Good | Inv. st. |
| 75 | m | E | m | 300 | 261 | 301 | 1.15 | 1.15 | 1.3 | 1.4 | 0.28 | 797 | 0.6 | Good | Good | Good | Inv. st. |
| 76 | n | E | n | 288 | 260 | 288 | 1.11 | 1.11 | 1.3 | 1.2 | 0.28 | 784 | 0.57 | Good | Good | Good | Inv. st. |
| 77 | o | E | o | 277 | 259 | 275 | 1.07 | 1.06 | 1.4 | 1.3 | 0.28 | 772 | 0.54 | Good | Good | Good | Inv. st. |
| 78 | p | E | p | 345 | 259 | 346 | 1.33 | 1.34 | 1.3 | 1.4 | 0.27 | 836 | 0.74 | Good | Good | Good | Inv. st. |
| 79 | q | E | q | 310 | 260 | 309 | 1.19 | 1.19 | 1.2 | 1.1 | 0.29 | 804 | 0.63 | Good | Good | Good | Inv. st. |
| 80 | r | E | r | 366 | 262 | 361 | 1.4 | 1.38 | 1.3 | 1.4 | 0.29 | 857 | 0.77 | Good | Good | Good | Inv. st. |
| 81 | s | E | s | 360 | 260 | 358 | 1.38 | 1.38 | 1.3 | 1.4 | 0.29 | 850 | 0.77 | Good | Good | Good | Inv. st. |
| 82 | t | E | t | 399 | 258 | 395 | 1.55 | 1.53 | 1.1 | 1.3 | 0.29 | 883 | 0.86 | Good | Good | Good | Inv. st. |
| 83 | j | F | j | 305 | 202 | 305 | 1.51 | 1.51 | 1.3 | 1.4 | 0.01 | 719 | 0.84 | Good | Good | Good | Inv. st. |
| 84 | l | F | l | 396 | 200 | 395 | 1.98 | 1.98 | 1.4 | 1.3 | 0.01 | 800 | 1.08 | Good | Good | Good | Inv. st. |
| 85 | m | F | m | 301 | 202 | 300 | 1.49 | 1.49 | 1.6 | 1.5 | 0.01 | 715 | 0.82 | Good | Good | Good | Inv. st. |
| 86 | n | F | n | 288 | 205 | 288 | 1.4 | 1.4 | 1.3 | 1.4 | 0.01 | 708 | 0.77 | Good | Good | Good | Inv. st. |
| 87 | o | F | o | 271 | 202 | 270 | 1.34 | 1.34 | 1.5 | 1.6 | 0.01 | 687 | 0.73 | Good | Good | Good | Inv. st. |
| 88 | p | F | p | 346 | 204 | 345 | 1.7 | 1.69 | 1.4 | 1.3 | 0.01 | 760 | 0.94 | Good | Good | Good | Inv. st. |
| 89 | q | F | q | 309 | 204 | 310 | 1.51 | 1.52 | 1.6 | 1 | 0.01 | 726 | 0.84 | Good | Good | Good | Inv. st. |
| 90 | r | F | r | 361 | 202 | 366 | 1.79 | 1.81 | 1.5 | 1.6 | 0.01 | 774 | 0.99 | Good | Good | Good | Inv. st. |
| 91 | s | F | s | 358 | 201 | 360 | 1.78 | 1.79 | 1.4 | 1.3 | 0.01 | 768 | 0.99 | Good | Good | Good | Inv. st. |
| 92 | t | F | t | 395 | 201 | 399 | 1.97 | 1.99 | 1.6 | 1.5 | 0.01 | 803 | 1.08 | Good | Good | Good | Inv. st. |

TABLE 4-2

| | Layer configuration | | | Vickers hardness | | | Hardness ratio | | Standard deviation | | Vcem | TS | Fatigue limit | Roll forming: Cracking after cross-section | | | |
|---|---|---|---|---|---|---|---|---|---|---|---|---|---|---|---|---|---|
| No | Top | Inner | Bottom | Top | Inner | Bottom | Top | Bottom | Top | Bottom | Inner | MPa | ratio | Top | Inner | Bottom | Remarks |
| 93 | a | G | a | 316 | 299 | 314 | 1.06 | 1.05 | 1.3 | 1.4 | 0.01 | 864 | 0.53 | Good | Good | Good | Inv. st. |
| 94 | a | H | a | 314 | 262 | 314 | 1.2 | 1.2 | 1.5 | 1.6 | 0.08 | 811 | 0.64 | Good | Good | Good | Inv. st. |
| 95 | a | I | a | 314 | 252 | 314 | 1.25 | 1.25 | 1.4 | 1.3 | 0.25 | 797 | 0.67 | Good | Good | Good | Inv. st. |
| 96 | a | J | a | 316 | 298 | 316 | 1.06 | 1.06 | 1.2 | 1 | 0.45 | 863 | 0.53 | Good | Good | Good | Inv. st. |
| 97 | a | L | a | 315 | 393 | 314 | 0.8 | 0.8 | 1.3 | 1.2 | 0.8 | 994 | 0.28 | Good | Good | Good | Comp. st. |
| 98 | a | M | a | 316 | 299 | 316 | 1.06 | 1.06 | 1.4 | 1.3 | 0.82 | 864 | 0.53 | Good | Good | Good | Inv. st. |
| 99 | a | N | a | 314 | 289 | 314 | 1.09 | 1.09 | 1.3 | 1.4 | 0.9 | 849 | 0.55 | Good | Good | Good | Inv. st. |
| 100 | a | O | a | 314 | 270 | 314 | 1.16 | 1.16 | 1.6 | 1.5 | 0.95 | 822 | 0.61 | Good | Good | Good | Inv. st. |
| 101 | a | P | a | 316 | 292 | 316 | 1.08 | 1.08 | 1.3 | 1.4 | 1.42 | 855 | 0.55 | Good | Good | Good | Inv. st. |
| 102 | a | Q | a | 314 | 290 | 314 | 1.08 | 1.08 | 1.5 | 1.6 | 1.6 | 850 | 0.55 | Good | Good | Good | Inv. st. |
| 103 | a | S | a | 315 | 363 | 315 | 0.87 | 0.87 | 1.4 | 1.3 | 1.62 | 953 | 0.35 | Good | Good | Good | Comp. st. |
| 104 | b | G | b | 317 | 298 | 318 | 1.06 | 1.07 | 1.6 | 1 | 0.01 | 864 | 0.54 | Good | Good | Good | Inv. st. |
| 105 | b | H | b | 317 | 263 | 319 | 1.21 | 1.21 | 1.5 | 1.6 | 0.09 | 816 | 0.65 | Good | Good | Good | Inv. st. |
| 106 | b | I | b | 318 | 252 | 319 | 1.26 | 1.27 | 1.2 | 1 | 0.24 | 801 | 0.69 | Good | Good | Good | Inv. st. |
| 107 | b | J | b | 318 | 300 | 318 | 1.06 | 1.06 | 1.3 | 1.4 | 0.44 | 868 | 0.53 | Good | Good | Good | Inv. st. |
| 108 | b | L | b | 317 | 393 | 318 | 0.81 | 0.81 | 1.4 | 1.3 | 0.82 | 997 | 0.29 | Good | Good | Good | Comp. st. |
| 109 | b | M | b | 317 | 300 | 320 | 1.06 | 1.07 | 1.3 | 1.4 | 0.81 | 868 | 0.53 | Good | Good | Good | Inv. st. |

TABLE 4-2-continued

| | Layer configuration | | | Vickers hardness | | | Hardness ratio | | Standard deviation | | Vcem | TS | Fatigue limit | Roll forming: Cracking after cross-section | | | |
|---|---|---|---|---|---|---|---|---|---|---|---|---|---|---|---|---|---|
| No | Top | Inner | Bottom | Top | Inner | Bottom | Top | Bottom | Top | Bottom | Inner | MPa | ratio | Top | Inner | Bottom | Remarks |
| 110 | b | N | b | 316 | 290 | 318 | 1.09 | 1.1 | 1.2 | 1.1 | 0.91 | 853 | 0.56 | Good | Good | Good | Inv. st. |
| 111 | b | O | b | 316 | 272 | 318 | 1.16 | 1.17 | 1.3 | 1.4 | 0.99 | 828 | 0.61 | Good | Good | Good | Inv. st. |
| 112 | b | P | b | 317 | 298 | 316 | 1.06 | 1.06 | 1.3 | 1.4 | 1.35 | 864 | 0.53 | Good | Good | Good | Inv. st. |
| 113 | b | Q | b | 317 | 298 | 317 | 1.06 | 1.06 | 1.5 | 1.6 | 1.5 | 864 | 0.53 | Good | Good | Good | Inv. st. |
| 114 | b | R | b | 315 | 413 | 317 | 0.76 | 0.77 | 1.2 | 1.4 | 1.55 | 958 | 0.35 | Good | Poor | Good | Comp. st. |
| 115 | b | S | b | 317 | 365 | 317 | 0.87 | 0.87 | 1.2 | 1 | 1.7 | 957 | 0.36 | Good | Good | Good | Comp. st. |
| 116 | b | U | b | 317 | 431 | 318 | 0.74 | 0.74 | 1.3 | 1.4 | 2.33 | 1050 | 0.21 | Good | Poor | Good | Comp. st. |
| 117 | b | W | b | 318 | 78 | 318 | 4.08 | 4.08 | 1.3 | 1.2 | 0.01 | 559 | 0.24 | Good | Good | Good | Comp. st. |
| 118 | b | X | b | 318 | 413 | 318 | 0.77 | 0.77 | 1.6 | 1.5 | 1.1 | 1025 | 0.25 | Good | Poor | Good | Comp. st. |
| 119 | b | Y | b | 317 | 234 | 318 | 1.35 | 1.36 | 1.3 | 1.4 | 1.3 | 775 | 0.75 | Good | Good | Good | Inv. st. |
| 120 | b | Z | b | 317 | 412 | 318 | 0.77 | 0.77 | 1.5 | 1.6 | 1.41 | 1023 | 0.25 | Good | Poor | Good | Comp. st. |
| 121 | b | AA | b | 317 | 306 | 319 | 1.04 | 1.04 | 1.8 | 1.7 | 0.83 | 868 | 0.38 | Good | Poor | Good | Comp. st. |
| 122 | b | AB | b | 315 | 308 | 319 | 1.04 | 1.04 | 1.4 | 1.5 | 1.33 | 850 | 0.41 | Good | Poor | Good | Comp. st. |
| 123 | b | AC | b | 317 | 405 | 318 | 0.78 | 0.79 | 1.6 | 1.6 | 0.81 | 860 | 0.4 | Good | Poor | Good | Comp. st. |
| 124 | b | AD | b | 317 | 433 | 318 | 0.73 | 0.73 | 1.4 | 1.3 | 1.34 | 1052 | 0.21 | Good | Poor | Good | Comp. st. |
| 125 | b | AE | b | 317 | 410 | 318 | 0.77 | 0.78 | 1.3 | 1.4 | 1.33 | 1020 | 0.26 | Good | Poor | Good | Comp. st. |
| 126 | b | AF | b | 319 | 307 | 320 | 1.04 | 1.04 | 1.7 | 1.5 | 0.61 | 841 | 0.4 | Good | Poor | Good | Comp. st. |
| 127 | b | AG | b | 317 | 409 | 318 | 0.78 | 0.78 | 1.8 | 1.9 | 0.8 | 1019 | 0.26 | Good | Poor | Good | Comp. st. |
| 128 | b | AH | b | 317 | 425 | 318 | 0.75 | 0.75 | 1.4 | 1.3 | 0.95 | 1041 | 0.22 | Good | Poor | Good | Comp. st. |
| 129 | b | AI | b | 317 | 412 | 316 | 0.77 | 0.77 | 1.2 | 1 | 1.1 | 1022 | 0.25 | Good | Poor | Good | Comp. st. |
| 130 | b | AJ | b | 317 | 410 | 318 | 0.77 | 0.78 | 1.3 | 1.4 | 0.92 | 1020 | 0.26 | Good | Poor | Good | Comp. st. |
| 131 | c | G | c | 291 | 315 | 290 | 0.92 | 0.92 | 1.3 | 1.2 | 0.01 | 863 | 0.41 | Good | Good | Good | Comp. st. |
| 132 | c | H | c | 291 | 265 | 290 | 1.1 | 1.09 | 1.2 | 1 | 0.09 | 793 | 0.56 | Good | Good | Good | Inv. st. |
| 133 | c | I | c | 291 | 253 | 290 | 1.15 | 1.15 | 1.3 | 1.4 | 0.25 | 777 | 0.6 | Good | Good | Good | Inv. st. |
| 134 | c | J | c | 289 | 300 | 290 | 0.96 | 0.97 | 1.3 | 1.2 | 0.43 | 841 | 0.43 | Good | Good | Good | Comp. st. |
| 135 | c | L | c | 290 | 395 | 289 | 0.73 | 0.73 | 1.3 | 1.4 | 0.78 | 973 | 0.21 | Good | Good | Good | Comp. st. |
| 136 | c | M | c | 289 | 304 | 290 | 0.95 | 0.95 | 1.2 | 1.1 | 0.84 | 847 | 0.44 | Good | Good | Good | Comp. st. |
| 137 | c | N | c | 291 | 275 | 290 | 1.06 | 1.05 | 1.3 | 1.4 | 0.82 | 807 | 0.53 | Good | Good | Good | Inv. st. |
| 138 | c | O | c | 290 | 272 | 291 | 1.07 | 1.07 | 1.3 | 1.4 | 0.91 | 803 | 0.54 | Good | Good | Good | Inv. st. |
| 139 | c | P | c | 290 | 314 | 292 | 0.92 | 0.93 | 1.3 | 1.2 | 1.41 | 862 | 0.42 | Good | Good | Good | Comp. st. |
| 140 | c | Q | c | 288 | 310 | 290 | 0.93 | 0.94 | 1.4 | 1.3 | 1.58 | 855 | 0.42 | Good | Good | Good | Comp. st. |
| 141 | c | S | c | 291 | 360 | 290 | 0.81 | 0.81 | 1.3 | 1.4 | 1.54 | 926 | 0.29 | Good | Good | Good | Comp. st. |

TABLE 5-1

| | Layer configuration | | Position of hard layer | Hot rolling conditions | | | Vickers hardness (HV) | | | Hardness ratio |
|---|---|---|---|---|---|---|---|---|---|---|
| | | | | Holding time (min) | Finish temp. (° C.) | Coiling temp. (° C.) | | | | |
| No. | Top/bottom | Inner | | | | | Top | Inner | Bottom | Top |
| 142 | b | A | 2 sides | 10 | 900 | 500 | 321 | 285 | 321 | 1.13 |
| 143 | d | A | 2 sides | 10 | 600 | 500 | 403 | 388 | 401 | 1.04 |
| 144 | d | A | 2 sides | 10 | 800 | 500 | 338 | 286 | 338 | 1.18 |
| 145 | p | A | 2 sides | 10 | 800 | 730 | 200 | 195 | 199 | 1.03 |
| 146 | p | A | 2 sides | 10 | 900 | 500 | 309 | 287 | 310 | 1.08 |
| 147 | d | B | 2 sides | 30 | 925 | 80 | 352 | 331 | 351 | 1.06 |
| 148 | k | B | 2 sides | 30 | 925 | 80 | 390 | 333 | 391 | 1.17 |
| 149 | s | B | 2 sides | 30 | 925 | 80 | 366 | 335 | 365 | 1.09 |
| 150 | d | C | 2 sides | 30 | 890 | 580 | 311 | 276 | 311 | 1.13 |
| 151 | l | C | 2 sides | 400 | 890 | 580 | 301 | 294 | 305 | 1.02 |
| 152 | l | C | 2 sides | 30 | 890 | 580 | 311 | 278 | 310 | 1.12 |
| 153 | p | C | 2 sides | 30 | 890 | 580 | 296 | 279 | 296 | 1.06 |
| 154 | k | D | 2 sides | 5 | 890 | 450 | 388 | 345 | 388 | 1.12 |
| 155 | l | D | 2 sides | 5 | 890 | 450 | 395 | 345 | 397 | 1.14 |
| 156 | p | D | 2 sides | 5 | 890 | 450 | 371 | 344 | 370 | 1.08 |
| 157 | b | E | 2 sides | 50 | 1100 | 50 | 414 | 359 | 413 | 1.15 |
| 158 | b | E | 2 sides | 50 | 900 | 50 | 377 | 243 | 378 | 1.55 |
| 159 | j | E | 2 sides | 50 | 900 | 50 | 366 | 245 | 364 | 1.49 |
| 160 | n | E | 2 sides | 50 | 900 | 50 | 331 | 244 | 333 | 1.36 |
| 161 | g | F | 2 sides | 20 | 940 | 650 | 244 | 111 | 243 | 2.2 |
| 162 | o | F | 2 sides | 320 | 940 | 650 | 255 | 177 | 233 | 1.44 |
| 163 | o | F | 2 sides | 20 | 940 | 650 | 253 | 110 | 251 | 2.3 |
| 164 | a | G | 2 sides | 200 | 940 | 650 | 268 | 254 | 268 | 1.06 |
| 165 | d | G | 2 sides | 200 | 940 | 650 | 280 | 254 | 282 | 1.1 |
| 166 | b | H | 2 sides | 100 | 910 | 500 | 325 | 289 | 325 | 1.12 |
| 167 | q | H | 2 sides | 100 | 910 | 500 | 330 | 288 | 332 | 1.15 |
| 168 | c | I | 2 sides | 30 | 950 | 450 | 311 | 252 | 312 | 1.23 |
| 169 | m | I | 2 sides | 30 | 950 | 450 | 350 | 252 | 351 | 1.39 |

TABLE 5-1-continued

| No | Layer Top/bottom | Inner | Position of hard layer | Holding time (min) | Finish temp. (° C.) | Coiling temp. (° C.) | Vickers hardness Top | Inner | Bottom | Hardness ratio Top |
|---|---|---|---|---|---|---|---|---|---|---|
| 170 | b | J | 2 sides | 40 | 890 | 600 | 311 | 291 | 312 | 1.07 |
| 171 | s | J | 2 sides | 40 | 890 | 600 | 350 | 291 | 350 | 1.2 |
| 172 | j | M | 2 sides | 30 | 910 | 550 | 312 | 296 | 313 | 1.05 |
| 173 | d | N | 2 sides | 150 | 860 | 600 | 306 | 271 | 307 | 1.13 |
| 174 | s | N | 2 sides | 150 | 860 | 600 | 340 | 270 | 342 | 1.26 |

| No. | Hardness ratio Bottom | Standard deviation Top | Bottom | Carbide volume rate (vol %) Inner | TS (MPa) | Fatigue limit ratio | Roll forming: Cracking after cross-section Top | Inner | Bottom | Remarks |
|---|---|---|---|---|---|---|---|---|---|---|
| 142 | 1.13 | 1.4 | 1.1 | 0.8 | 850 | 0.58 | Good | Good | Good | Inv. ex. |
| 143 | <u>1.03</u> | 1.6 | 1.1 | 0.9 | 1068 | <u>0.41</u> | Poor | Good | Poor | Comp. ex. |
| 144 | 1.18 | 1.3 | 1.4 | 0.83 | 867 | 0.63 | Good | Good | Good | Inv. ex. |
| 145 | <u>1.02</u> | 1.5 | 1.6 | 1.06 | 612 | <u>0.43</u> | Good | Good | Good | Comp. ex. |
| 146 | 1.08 | 1.4 | 1.3 | 0.8 | 842 | 0.55 | Good | Good | Good | Inv. ex. |
| 147 | 1.06 | 1.2 | 1.5 | 0.37 | 942 | 0.53 | Good | Good | Good | Inv. ex. |
| 148 | 1.17 | 1.3 | 1.4 | 0.37 | 981 | 0.62 | Good | Good | Good | Inv. ex. |
| 149 | 1.09 | 1.2 | 1.2 | 0.37 | 961 | 0.56 | Good | Good | Good | Inv. ex. |
| 150 | 1.13 | 1.2 | 0.9 | 1.78 | 828 | 0.59 | Good | Good | Good | Inv. ex. |
| 151 | 1.04 | <u>3.8</u> | <u>4.1</u> | 1.78 | 845 | <u>0.34</u> | Good | Good | Good | Comp. ex. |
| 152 | 1.12 | 1.3 | 1.4 | 1.78 | 830 | 0.58 | Good | Good | Good | Inv. ex. |
| 153 | 1.06 | 1.4 | 1.2 | 1.78 | 818 | 0.53 | Good | Good | Good | Inv. ex. |
| 154 | 1.12 | 1.3 | 1.4 | 1.45 | 995 | 0.58 | Good | Good | Good | Inv. ex. |
| 155 | 1.15 | 1.3 | 1.4 | 1.45 | 1003 | 0.6 | Good | Good | Good | Inv. ex. |
| 156 | 1.08 | 1.4 | 1.2 | 1.45 | 978 | 0.54 | Good | Good | Good | Inv. ex. |
| 157 | 1.15 | <u>2.6</u> | <u>2.3</u> | 0.08 | 1038 | <u>0.31</u> | Poor | Good | Poor | Comp. ex. |
| 158 | 1.56 | 1.2 | 1.1 | 0.15 | 844 | 0.87 | Good | Good | Good | Inv. ex. |
| 159 | 1.49 | 1.3 | 1.4 | 0.15 | 835 | 0.83 | Good | Good | Good | Inv. ex. |
| 160 | 1.36 | 1.4 | 1.2 | 0.15 | 803 | 0.75 | Good | Good | Good | Inv. ex. |
| 161 | 2.19 | 1.3 | 1.3 | 0.01 | 535 | 1.1 | Good | Good | Good | Inv. ex. |
| 162 | 1.32 | <u>3.5</u> | <u>3.1</u> | 0.01 | 628 | <u>0.4</u> | Good | Good | Good | Comp. ex. |
| 163 | 2.28 | 1.2 | 1.3 | 0.01 | 542 | 1.14 | Good | Good | Good | Inv. ex. |
| 164 | 1.06 | 1.2 | 1.6 | 0.01 | 757 | 0.53 | Good | Good | Good | Inv. ex. |
| 165 | 1.11 | 1.4 | 1.3 | 0.01 | 769 | 0.57 | Good | Good | Good | Inv. ex. |
| 166 | 1.12 | 1.6 | 1.5 | 0.1 | 859 | 0.58 | Good | Good | Good | Inv. ex. |
| 167 | 1.15 | 1.3 | 1.4 | 0.1 | 863 | 0.6 | Good | Good | Good | Inv. ex. |
| 168 | 1.24 | 1.4 | 1.2 | 0.38 | 795 | 0.67 | Good | Good | Good | Inv. ex. |
| 169 | 1.39 | 1.6 | 1.3 | 0.38 | 831 | 0.77 | Good | Good | Good | Inv. ex. |
| 170 | 1.07 | 1.3 | 1.5 | 0.75 | 849 | 0.54 | Good | Good | Good | Inv. ex. |
| 171 | 1.2 | 1.5 | 1.4 | 0.75 | 885 | 0.64 | Good | Good | Good | Inv. ex. |
| 172 | 1.06 | 1.4 | 1.2 | 1.05 | 857 | 0.53 | Good | Good | Good | Inv. ex. |
| 173 | 1.13 | 1.2 | 1.2 | 1.21 | 817 | 0.59 | Good | Good | Good | Inv. ex. |
| 174 | 1.27 | 1.3 | 1.2 | 1.21 | 847 | 0.69 | Good | Good | Good | Inv. ex. |

TABLE 5-2

| No | Layer configuration Top/bottom | Inner | Position of hard layer | Hot rolling conditions Holding time (min) | Finish temp. (° C.) | Coiling temp. (° C.) | Vickers hardness (HV) Top | Inner | Bottom | Hardness ratio Top |
|---|---|---|---|---|---|---|---|---|---|---|
| 175 | b | O | 2 sides | 30 | <u>1100</u> | 580 | <u>410</u> | <u>455</u> | <u>410</u> | <u>0.9</u> |
| 176 | b | O | 2 sides | 30 | 860 | 580 | 278 | 260 | 280 | 1.07 |
| 177 | p | O | 2 sides | 30 | 860 | 580 | 294 | 263 | 296 | 1.12 |
| 178 | j | P | 2 sides | 30 | 870 | 500 | 309 | 294 | 309 | 1.05 |
| 179 | s | P | 2 sides | 30 | 870 | 500 | 385 | 295 | 388 | 1.31 |
| 180 | j | Q | 2 sides | 50 | 890 | 50 | 315 | 301 | 315 | 1.05 |
| 181 | s | Q | 2 sides | 50 | 890 | 50 | 399 | 305 | 398 | 1.31 |
| 182 | b | A | 1 side | 10 | 900 | 500 | 321 | 285 | — | 1.13 |
| 183 | l | C | 1 side | 30 | 890 | 580 | 311 | 278 | — | 1.12 |
| 184 | k | D | 1 side | 5 | 890 | 450 | 388 | 345 | — | 1.12 |
| 185 | j | E | 1 side | 50 | 900 | 50 | 366 | 245 | — | 1.49 |
| 186 | a | G | 1 side | 200 | 940 | 650 | 288 | 255 | — | 1.13 |
| 187 | c | I | 1 side | 30 | 950 | 450 | 311 | 252 | — | 1.23 |
| 188 | s | J | 1 side | 40 | 890 | 600 | 350 | 291 | — | 1.2 |
| 189 | b | O | 1 side | 30 | 860 | 580 | 278 | 260 | — | 1.07 |
| 190 | s | P | 1 side | 30 | 870 | 500 | 385 | 295 | — | 1.31 |

TABLE 5-2-continued

| No | Hardness ratio Bottom | Standard deviation Top | Standard deviation Bottom | Carbide volume rate (vol %) Inner | TS (MPa) | Fatigue limit ratio | Roll forming: Cracking after cross-section Top | Roll forming: Cracking after cross-section Inner | Roll forming: Cracking after cross-section Bottom | Remarks |
|---|---|---|---|---|---|---|---|---|---|---|
| 175 | 0.9 | 2.8 | 3.5 | 1.16 | 1169 | 0.23 | Poor | Good | Poor | Comp. ex. |
| 176 | 1.08 | 1.4 | 1.4 | 1.24 | 776 | 0.54 | Good | Good | Good | Inv. ex. |
| 177 | 1.13 | 1.6 | 1.6 | 1.24 | 795 | 0.58 | Good | Good | Good | Inv. ex. |
| 178 | 1.05 | 1.3 | 1.3 | 1.61 | 851 | 0.52 | Good | Good | Good | Inv. ex. |
| 179 | 1.32 | 1.5 | 1.5 | 1.61 | 924 | 0.72 | Good | Good | Good | Inv. ex. |
| 180 | 1.05 | 1.4 | 1.4 | 1.35 | 866 | 0.52 | Good | Good | Good | Inv. ex. |
| 181 | 1.3 | 1.6 | 1.2 | 1.35 | 949 | 0.72 | Good | Good | Good | Inv. ex. |
| 182 | — | 1.3 | 1.3 | 1 | 837 | 0.53 | Good | Good | — | Inv. ex. |
| 183 | — | 1.5 | 1.5 | 1.78 | 819 | 0.52 | Good | Good | — | Inv. ex. |
| 184 | — | 1.4 | 1.4 | 1.45 | 980 | 0.52 | Good | Good | — | Inv. ex. |
| 185 | — | 1.6 | 1.4 | 0.05 | 794 | 0.64 | Good | Good | — | Inv. ex. |
| 186 | — | 1.3 | 1.6 | 0.01 | 766 | 0.53 | Good | Good | — | Inv. ex. |
| 187 | — | 1.5 | 1.3 | 0.38 | 774 | 0.56 | Good | Good | — | Inv. ex. |
| 188 | — | 1.4 | 1.5 | 0.75 | 864 | 0.55 | Good | Good | — | Inv. ex. |
| 189 | — | 1.2 | 1.4 | 1.24 | 769 | 0.51 | Good | Good | — | Inv. ex. |
| 190 | — | 1.1 | 1.2 | 1.61 | 892 | 0.58 | Good | Good | — | Inv. ex. |

TABLE 6

| No | Layer configuration Top/bottom | Layer configuration Inner | Position of hard layer | Hot rolling Holding time (min) | Hot rolling Finish temp. (°C.) | Hot rolling Coiling temp. (°C.) | Cold rolling-annealing Cold rolling rate (%) | Cold rolling-annealing Annealing temp. (°C.) | Vickers hardness (HV) Top | Vickers hardness (HV) Inner | Vickers hardness (HV) Bottom |
|---|---|---|---|---|---|---|---|---|---|---|---|
| 191 | b | A | 2 sides | 10 | 900 | 500 | 45 | 820 | 309 | 274 | 311 |
| 192 | d | A | 2 sides | 10 | 800 | 500 | 45 | 820 | 320 | 277 | 319 |
| 193 | p | A | 2 sides | 10 | 900 | 500 | 45 | 820 | 296 | 275 | 298 |
| 194 | d | C | 2 sides | 30 | 890 | 580 | 60 | 800 | 301 | 263 | 300 |
| 195 | l | C | 2 sides | 30 | 890 | 580 | 60 | 800 | 286 | 260 | 288 |
| 196 | p | C | 2 sides | 30 | 890 | 580 | 60 | 800 | 278 | 258 | 274 |
| 197 | g | F | 2 sides | 20 | 940 | 650 | 85 | 780 | 280 | 103 | 279 |
| 198 | o | F | 2 sides | 20 | 940 | 650 | 85 | 780 | 276 | 103 | 275 |
| 199 | b | H | 2 sides | 100 | 910 | 500 | 40 | 850 | 325 | 265 | 325 |
| 200 | q | H | 2 sides | 100 | 910 | 500 | 40 | 850 | 301 | 265 | 301 |
| 201 | b | J | 2 sides | 40 | 890 | 600 | 40 | 800 | 300 | 278 | 298 |
| 202 | s | J | 2 sides | 40 | 890 | 600 | 40 | 800 | 338 | 278 | 337 |
| 203 | b | O | 2 sides | 30 | 860 | 580 | 55 | 750 | 259 | 244 | 261 |
| 204 | p | O | 2 sides | 30 | 860 | 580 | 55 | 750 | 299 | 250 | 301 |
| 205 | j | P | 2 sides | 30 | 870 | 500 | 40 | 780 | 324 | 301 | 325 |
| 206 | s | P | 2 sides | 30 | 870 | 500 | 40 | 780 | 398 | 300 | 397 |
| 207 | b | A | 1 side | 10 | 900 | 500 | 45 | 820 | 310 | 275 | — |
| 208 | l | C | 1 side | 30 | 890 | 580 | 60 | 800 | 285 | 260 | — |
| 209 | s | J | 1 side | 40 | 890 | 600 | 40 | 800 | 338 | 278 | — |
| 210 | b | O | 1 side | 30 | 860 | 580 | 55 | 750 | 260 | 260 | — |
| 211 | s | P | 1 side | 30 | 870 | 500 | 40 | 780 | 390 | 302 | — |

| No | Hardness ratio Top | Hardness ratio Bottom | Standard deviation Top | Standard deviation Bottom | Carbide volume rate (vol %) Inner | TS (MPa) | Fatigue limit ratio | Roll forming: Cracking after cross-section Top | Roll forming: Cracking after cross-section Inner | Roll forming: Cracking after cross-section Bottom | Remarks |
|---|---|---|---|---|---|---|---|---|---|---|---|
| 191 | 1.13 | 1.14 | 1.4 | 1.1 | 0.76 | 824 | 0.59 | Good | Good | Good | Inv. ex. |
| 192 | 1.16 | 1.15 | 1.3 | 1.4 | 0.79 | 837 | 0.61 | Good | Good | Good | Inv. ex. |
| 193 | 1.08 | 1.08 | 1.4 | 1.3 | 0.76 | 813 | 0.55 | Good | Good | Good | Inv. ex. |
| 194 | 1.14 | 1.14 | 1.2 | 0.9 | 1.72 | 800 | 0.6 | Good | Good | Good | Inv. ex. |
| 195 | 1.1 | 1.11 | 1.3 | 1.4 | 1.72 | 783 | 0.57 | Good | Good | Good | Inv. ex. |
| 196 | 1.08 | 1.06 | 1.4 | 1.2 | 1.72 | 770 | 0.54 | Good | Good | Good | Inv. ex. |
| 197 | 2.72 | 2.71 | 1.3 | 1.3 | 0.01 | 558 | 1.26 | Good | Good | Good | Inv. ex. |
| 198 | 2.68 | 2.67 | 1.2 | 1.3 | 0.01 | 554 | 1.25 | Good | Good | Good | Inv. ex. |
| 199 | 1.23 | 1.23 | 1.6 | 1.5 | 0.04 | 825 | 0.66 | Good | Good | Good | Inv. ex. |
| 200 | 1.14 | 1.14 | 1.3 | 1.4 | 0.04 | 803 | 0.59 | Good | Good | Good | Inv. ex. |
| 201 | 1.08 | 1.07 | 1.3 | 1.5 | 0.51 | 819 | 0.55 | Good | Good | Good | Inv. ex. |
| 202 | 1.22 | 1.21 | 1.5 | 1.4 | 0.51 | 855 | 0.65 | Good | Good | Good | Inv. ex. |
| 203 | 1.06 | 1.07 | 1.4 | 1.4 | 0.99 | 736 | 0.54 | Good | Good | Good | Inv. ex. |
| 204 | 1.2 | 1.2 | 1.6 | 1.6 | 0.99 | 781 | 0.64 | Good | Good | Good | Inv. ex. |

TABLE 6-continued

| | | | | | | | | | | | |
|---|---|---|---|---|---|---|---|---|---|---|---|
| 205 | 1.08 | 1.08 | 1.3 | 1.3 | 1.37 | 875 | 0.55 | Good | Good | Good | Inv. ex. |
| 206 | 1.33 | 1.32 | 1.5 | 1.5 | 1.37 | 941 | 0.73 | Good | Good | Good | Inv. ex. |
| 207 | 1.13 | — | 1.3 | 1.3 | 0.76 | 813 | 0.53 | Good | Good | Good | Inv. ex. |
| 208 | 1.1 | — | 1.5 | 1.5 | 1.72 | 773 | 0.51 | Good | Good | Good | Inv. ex. |
| 209 | 1.22 | — | 1.4 | 1.5 | 0.51 | 835 | 0.55 | Good | Good | Good | Inv. ex. |
| 210 | 1 | — | 1.2 | 1.4 | 0.99 | 758 | 0.48 | Good | Good | Good | Inv. ex. |
| 211 | 1.29 | — | 1.1 | 1.2 | 1.37 | 907 | 0.58 | Good | Good | Good | Inv. ex. |

The invention claimed is:

1. A multi-layer steel sheet comprising
an inner layer and
a hard layer on one or both surfaces of the inner layer, the steel sheet characterized in that
a thickness of the hard layer is 20 μm or more and 40% or less of a thickness of the steel sheet,
an average micro-Vickers hardness of the hard layer is 240 HV or more and less than 400 HV,
an amount of C of the hard layer is 0.4 mass % or less,
an amount of N of the hard layer is 0.02 mass % or less,
a standard deviation of a variation of hardness measured by a nanoindenter at a depth of 10 μm from a surface of the hard layer is 2.0 or less,
an average micro-Vickers hardness of the inner layer is 80 HV or more and less than 400 HV,
a volume rate of carbides contained in the inner layer is less than 2.00%, and
the average micro-Vickers hardness of the hard layer is 1.05 times or more the average micro-Vickers hardness of the inner layer, wherein
the hard layer contains, by mass %,
C: 0.03 to 0.35%,
Si: 0.01 to 3.00%,
Mn: 0.70 to 10.00%,
P: 0.0200% or less,
S: 0.0200% or less,
Al: 0.500% or less,
N: 0.0200% or less,
O: 0.0200% or less,
Ti: 0 to 0.500%,
B: 0 to 0.0100%,
Cr: 0 to 2.000%,
Mo: 0 to 1.000%,
Nb: 0 to 0.500%,
V: 0 to 0.500%,
Cu: 0 to 0.500%,
W: 0 to 0.100%,
Ta: 0 to 0.100%,
Ni: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
a balance of Fe and impurities and the inner layer contains, by mass %,
C: 0.001 to 0.300%,
Si: 0.01 to 3.00%,
Mn: 0.10 to 3.00%,
P: 0.0200% or less,
S: 0.0200% or less,
Al: 0.500% or less,
N: 0.0200% or less,
O: 0.0200% or less,
Ti: 0 to 0.500%,
B: 0 to 0.0100%,
Cr: 0 to 2.000%,
Mo: 0 to 1.000%,
Nb: 0 to 0.500%,
V: 0 to 0.500%,
Cu: 0 to 0.500%,
W: 0 to 0.100%,
Ta: 0 to 0.100%,
Ni: 0 to 0.500%,
Sn: 0 to 0.050%,
Sb: 0 to 0.050%,
As: 0 to 0.050%,
Mg: 0 to 0.0500%,
Ca: 0 to 0.050%,
Y: 0 to 0.050%,
Zr: 0 to 0.050%,
La: 0 to 0.050%,
Ce: 0 to 0.050%, and
a balance of Fe and impurities,
wherein the thickness of the steel sheet is 0.2 to 2.4 mm; and the fatigue limit ratio of the steel sheet is 0.50 or more.

2. The multi-layer steel sheet according to claim 1, wherein the tensile strength of the steel sheet is 535 MPa or more.

3. The multi-layer steel sheet according to claim 1, wherein
the tensile strength of the steel sheet is 739 MPa or more,
the thickness of the hard layer is 21 μm or more and 25% or less of a thickness of the steel sheet, and
the fatigue limit ratio of the steel sheet is 0.58 or more.

* * * * *